(12) United States Patent
Stethem et al.

(10) Patent No.: US 7,736,237 B2
(45) Date of Patent: Jun. 15, 2010

(54) ELECTROMUSCULAR INCAPACITATION DEVICE AND METHODS

(75) Inventors: Kenneth J. Stethem, Pacific Grove, CA (US); Casey Hathcock, Lisle, IL (US); Bruno D. V. Marino, Brunswick, ME (US); Anita Mehta, Plainfield, IL (US); Robert Randolph Bernard, Marion, IA (US); James Lee, Monterey Park, CA (US); Viet Thinh Pho, Anaheim, CA (US)

(73) Assignee: Aegis Industries, Inc., Pacific Grove, CA (US)

( * ) Notice: Subject to any disclaimer, the term of this patent is extended or adjusted under 35 U.S.C. 154(b) by 178 days.

(21) Appl. No.: 11/509,086

(22) Filed: Aug. 23, 2006

(65) Prior Publication Data

US 2007/0167241 A1 Jul. 19, 2007

Related U.S. Application Data

(63) Continuation-in-part of application No. 11/208,762, filed on Aug. 23, 2005, now abandoned.

(60) Provisional application No. 60/794,919, filed on Apr. 24, 2006, provisional application No. 60/794,325, filed on Apr. 21, 2006, provisional application No. 60/764,787, filed on Feb. 2, 2006, provisional application No. 60/764,785, filed on Feb. 2, 2006, provisional application No. 60/736,603, filed on Nov. 14, 2005, provisional application No. 60/736,132, filed on Nov. 11, 2005.

(51) Int. Cl.
*F41B 15/04* (2006.01)

(52) U.S. Cl. ..................................... 463/47.3

(58) Field of Classification Search ................ 463/47.3; 361/22; 231/7

See application file for complete search history.

(56) References Cited

U.S. PATENT DOCUMENTS

| 291,242 | A | 1/1884 | Tower |
| 427,549 | A | 5/1890 | Burton |

(Continued)

FOREIGN PATENT DOCUMENTS

| GB | 2196728 | 5/1988 |

(Continued)

OTHER PUBLICATIONS http://www.taserx26.com/Police_X26.pdf, Police The Lawenforcement Magazine, vol. 27, No. 6, Eclusive Preview Recharged, Taser International's New X26 is smaller, but more effective than any Taser on the markert, pp. 16-20, Jun. 2003.*

(Continued)

*Primary Examiner*—William M Pierce
(74) *Attorney, Agent, or Firm*—Goodwin Procter LLP

(57) ABSTRACT

Incapacitation of a mammalian subject results from the application of a pulsed, low-power electric waveform. The waveform is applied to the subject at a frequency and over a time period sufficient to induce involuntary muscular contraction. Additionally, the contraction causes limited lactic acid production and is non- or minimally-injurious to the subject's tissues. A device utilizing such a waveform is designed to control or otherwise subdue an individual.

21 Claims, 41 Drawing Sheets

U.S. PATENT DOCUMENTS

| | | | |
|---|---|---|---|
| 769,880 | A | 9/1904 | Trout et al. |
| 1,158,473 | A * | 11/1915 | Floyd ............................ 231/7 |
| 1,823,407 | A | 9/1931 | Potter |
| 2,176,994 | A * | 10/1939 | Hansen et al. ................. 231/7 |
| 2,208,852 | A * | 7/1940 | Mongan ........................ 231/7 |
| 2,253,315 | A | 8/1941 | Andrus |
| 2,266,606 | A | 12/1941 | Jones |
| 2,561,122 | A * | 7/1951 | Juergens ........................ 231/7 |
| 3,362,711 | A * | 1/1968 | Larsen et al. ............... 463/47.3 |
| 3,484,665 | A | 12/1969 | Ormsby |
| 3,625,222 | A * | 12/1971 | Shimizu ...................... 607/58 |
| 3,635,374 | A | 1/1972 | Anketell |
| 3,803,463 | A | 4/1974 | Cover |
| 3,804,463 | A | 4/1974 | Mordhorst et al. |
| 3,819,108 | A | 6/1974 | Jordan |
| 3,983,476 | A | 9/1976 | Konopasek et al. |
| 4,092,695 | A | 5/1978 | Henderson et al. |
| D255,139 | S | 5/1980 | Smith |
| 4,253,132 | A | 2/1981 | Cover |
| 4,424,932 | A | 1/1984 | Allen |
| D273,216 | S | 3/1984 | Sinrod |
| 4,479,171 | A | 10/1984 | Mains |
| 4,486,807 | A | 12/1984 | Yanez |
| 4,522,398 | A | 6/1985 | Swartz et al. |
| D289,313 | S | 4/1987 | Shy et al. |
| 4,667,431 | A | 5/1987 | Mendicino |
| 4,719,534 | A | 1/1988 | Ward |
| 4,842,277 | A | 6/1989 | LaCroix |
| 4,852,454 | A | 8/1989 | Batchelder |
| 4,964,636 | A | 10/1990 | Ashihara et al. |
| 4,968,034 | A | 11/1990 | Hsieh et al. |
| 5,041,951 | A | 8/1991 | Fan et al. |
| 5,060,123 | A | 10/1991 | Arnold |
| 5,086,377 | A | 2/1992 | Roberts |
| D329,510 | S | 9/1992 | Lin et al. |
| 5,153,365 | A | 10/1992 | Chang et al. |
| 5,192,074 | A | 3/1993 | Ashihara et al. |
| 5,193,048 | A | 3/1993 | Kaufman et al. |
| 5,201,865 | A | 4/1993 | Kuehn |
| D351,640 | S | 10/1994 | de Anda et al. |
| 5,361,776 | A | 11/1994 | Samuelson et al. |
| 5,363,285 | A | 11/1994 | Wideman |
| 5,384,544 | A | 1/1995 | Flugstad et al. |
| 5,467,247 | A | 11/1995 | de Anda et al. |
| 5,529,300 | A | 6/1996 | Frazier et al. |
| 5,654,867 | A | 8/1997 | Murray |
| 5,675,103 | A | 10/1997 | Herr |
| 5,698,815 | A | 12/1997 | Ragner |
| 5,800,460 | A | 9/1998 | Powers et al. |
| 5,842,601 | A | 12/1998 | Pierpoint |
| 5,842,602 | A | 12/1998 | Pierpoint |
| 5,879,374 | A | 3/1999 | Powers et al. |
| 5,952,600 | A | 9/1999 | Herr |
| 5,962,806 | A | 10/1999 | Coakley et al. |
| 5,986,872 | A | 11/1999 | Chaput |
| 6,022,120 | A | 2/2000 | Chang et al. |
| 6,091,597 | A | 7/2000 | Lin et al. |
| 6,185,458 | B1 | 2/2001 | Ochs et al. |
| 6,256,916 | B1 | 7/2001 | McNulty |
| 6,293,684 | B1 | 9/2001 | Riblett |
| 6,304,780 | B1 | 10/2001 | Owen et al. |
| 6,546,661 | B1 | 4/2003 | Staubs |
| 6,636,412 | B2 | 10/2003 | Smith |
| 6,643,114 | B2 * | 11/2003 | Stethem ...................... 361/232 |
| 6,658,779 | B2 | 12/2003 | Bauer et al. |
| 6,675,073 | B2 | 1/2004 | Kieman et al. |
| 6,791,816 | B2 * | 9/2004 | Stethem ...................... 361/232 |
| 6,807,762 | B1 | 10/2004 | Edwards |
| 6,877,434 | B1 | 4/2005 | McNulty, Jr. |
| 6,880,466 | B2 | 4/2005 | Carman |
| 6,898,887 | B1 | 5/2005 | Stratbucker |
| 6,922,931 | B2 | 8/2005 | Bauer et al. |
| 6,999,295 | B2 | 2/2006 | Watkins, III et al. |
| 7,102,870 | B2 * | 9/2006 | Nerheim ...................... 361/232 |
| 7,158,362 | B2 | 1/2007 | Smith |
| 2002/0170418 | A1 | 11/2002 | McNulty Jr. et al. |
| 2004/0065310 | A1 | 4/2004 | Masse |
| 2004/0156162 | A1 | 8/2004 | Nerheim |
| 2004/0156163 | A1 | 8/2004 | Nerheim |
| 2004/0264099 | A1 | 12/2004 | Sikes et al. |
| 2005/0039628 | A1 | 2/2005 | Carman |
| 2005/0043101 | A1 | 2/2005 | Knapp |
| 2005/0073796 | A1 | 4/2005 | Smith et al. |
| 2005/0073797 | A1 | 4/2005 | Smith et al. |
| 2005/0073798 | A1 | 4/2005 | Stethem |
| 2005/0152087 | A2 | 7/2005 | Smith et al. |
| 2005/0188888 | A1 | 9/2005 | Watkins et al. |
| 2006/0111750 | A1 | 5/2006 | Bowers |
| 2006/0206174 | A1 | 9/2006 | Honeycutt et al. |
| 2007/0079538 | A1 | 4/2007 | Smith et al. |
| 2007/0109712 | A1 | 5/2007 | Nerheim |
| 2007/0167241 | A1 | 7/2007 | Stethem et al. |
| 2008/0010888 | A1 | 1/2008 | Nerheim |
| 2008/0130193 | A1 | 6/2008 | Nerheim |

FOREIGN PATENT DOCUMENTS

| | | |
|---|---|---|
| WO | WO-03/075426 | 9/2003 |

OTHER PUBLICATIONS http://www.bizjournals.com/phoenix/stories/2006/03/20/daily33. html, Business Journal, Taser: New Study Supports Stun Gun Safety Claims, Mar. 2006.* http://ieeexplore.ieee.org/iel5/9009/28600/01280839. pdf?arnumber=1280839, Cardiac Safety of High Voltage TASER X26 Waverorm, 2003.* http://www.taser.com/research/Science/Pages/ TASERDeviceElectricalDesign.aspx, TASER Device Electical Design, Mar. 2007.* http://ieeexplore.ieee.org/iel5/10/4100819/04100852.pdf, Taser Dart-to-Heart Distance That Causes Ventricular Fibrillation in Pigs, IEE Transaction on Biomechanical Engineering, vol. 54, No. 3, Mar. 2007.* http://www.electronics-lab.com/projects/science/016/index.html, Electronics Lab website, High Voltage Stun Gun, 2004.* http://www.safetybasement.com/ How_Stun_Guns_work_Stun_Gun_s/316.htm, Know your stun gun before you buy, 2006.* http://en.wikipedia.org/wiki/Electric_shock, 2009.*

Dennis et al., "Acute Effects of Taser X26 Discharges in a Swine Model," The Journal of Trauma® Injury, Infection and Critical Care, vol. 63, No. 3, dated Sep. 2007, pp. 581-590.

Hodge et al., "Novel Kinetic Energy Penetrators for Electromagnetic Guns" website: <http://www.stromingmedia.us/>, 2004, pp. 8.

Kenny et al., "Sticky Shocker Assessment" Penn State Human Effects Advisory Panel, 1999, pp. 67.

Maier et al., "The Joint Non-Lethal Weapons Human Effects Center of Excellence" Technical Report, dated 2005, pp. 80.

Medical Studies, sales@Taser.com. dated May 6, 2008, 1 page.

NIJ In-Custody Death Study: The Impact of Use of Conducted Energy Devices, Nationa Institute of Justice, dated Jun. 23, 2008, 1 page.

Nimunkar et al., "Safety of pulsed electric devices," Physiol. Meas., 2009, pp. 101-114.

Rapport Technique Technical Report, CEI IEC 479-1, Troisieme edition, Third Edision 1994-09.

Sherry et al., "An Evaluation of electrical Properties and Bio-Behavioral Effects of Four Commercially Available Tasers and the JAYCOR Sticky Shocker" website: <http://www.stromingmedia.us/>, 2003, pp. 26.

Wu et al., "Taser Blunt Probe Dart-to-Heart Distance that Causes Ventricular Fibrillation in Pigs" IEEE Biomedical Engineering, vol. 55, No. 12, 208, pp. 2768-2771.

Taser Open Circuit Voltage Measurement Procedure, Taser international, 14 pages.
Taser Protect Life, Peak arcing voltage measurement of Taser X26 and M26 devices, dated May 21, 2008, 2 pages.
Taser® X26E Series Electronic Control Device Specification (Law Emforement X26), dated May 15, 2007, 1 page.
Taser International® Taser X26 Specification Sheet, 2003, 1 page.
Taser International® Taser M26 Specification Sheet, 2003, 1 page.
Valentino et al., "Taser X26 Discharges in Swine: Ventricular Rhythm Capture is Dependent on Discharge Vector," The Journal of Trauma® Injury, Infection and Critical Care, vol. 65, No. 8, dated Dec. 2008, pp. 1478-1487.
Walter et al., "Taser X26 Discharges in Swine Produce Potentially Fatal Ventricular Arrhythmias," Supplementary Video Content, 1 page.
"Effects of Current Passing Through the Human Body," IEC Publication 479-2, 2d ed., 1987, 48 pages.
Adams JE, III, Schechtman KB, Landt Y, Ladenson JH, Jaffe AS. Comparable detection of acute myocardial infarction by creatine kinase MB isoenzyme and cardiac troponin I. Clin Chem 1994; 40(7 Pt 1):1291-1295.
Apple FS, Christenson RH, Valdes R, Jr., Andriak AJ, Berg A, Duh SH et al. Simultaneous rapid measurement of whole blood myoglobin, creatine kinase MB, and cardiac troponin I by the triage cardiac panel for detection of myocardial infarction. Clin Chem 1999; 45(2):199-205.
Apple FS, Murakami M, Panteghini M, Christenson RH, Dati F, Mair J et al. International survey on the use of cardiac markers. Clin Chem 2001; 47(3):587-588.
Apple FS, Murakami MM, Quist HH, Pearce LA, Wieczorek S, Wu AH. Prognostic value of the Ortho Vitros cardiac troponin I assay in patients with symptoms of myocardial ischemia. Risk stratification using European Society of Cardiology/American College of Cardiology recommended cutoff values. Am J Clin Pathol 2003; 120(1):114-120.
Apple FS, Wu AH. Myocardial infarction redefined: role of cardiac troponin testing. Clin Chem 2001; 47(3):377-379.
Battershill P, Naughton B, Laur D, Panton K, Massine M, Anthony R. Taser technology review and interim recommendations. www.cprc.org/docs/bcopcc_final.pdf, <http://www.cprc.org/docs/bcopcc_final.pdf>,1-59. 2005.
Bentley et al., "Prolonged stage duration during incremental cycle exercise: effects on the lactate threshold and onset of blood lactate accumulation" Journal Appl. Physiol, vol. 85, 2001, pp. 351-357.
Bleetman A, Steyn R, Lee C. Introduction of the Taser into British policing. Implications for UK emergency departments: an overview of electronic weaponry. Emerg Med J 2004; 21(2):136-140.
Bleetman A, Steyn R. The advanced Taser: A medical review. www2.warwick.ac.uk/fac/med/healthcom/ emergencycare/research , 1-30. 2003.
Bollen PJA, Hansen AK, Rasmussen HJ. Important Biological Features. In Suckow MA, editor. The Laboratory Swine. Boca Raton: CRC Press, 2000: 1-14.
Böning et al., "Extracellular pH defense against lactic acid in untrained and trained altitude residents" Eur Journal Appl. Physiol, Accepted Dec. 2007, 11 pages.
Brechbuhler T, Kaeslin M, Wyler F. Reference values of various blood constituents in young minipigs. J.Clin.Chem.Biochem. 22, 301-304. 1984.
Cao et al., "Taser-Induced Rapid Ventricular Myocardial Capture Demonstrated by Pacemaker Intracardiac Electrograms" Journal of Cardiovascular Electrophysiology, vol. 18, No. 8, Aug. 2007, pp. 876-879.
Cooper et al., "Dangerous exercise: lessons learned from dysregulated inflammatory responses to physical activity" Journal Appl. Physiol, vol. 103, Aug. 2007, pp. 700-709.
Danielson Jr, Capelli-Schellpfeffer M, Lee RC. Upper extremity electrical injury. Hand Clin 2000; 16(2):225-34, viii.
Dawes et al., "15-Second conducted electrical weapon exposure does not cause core temperature elevation in non-environmentally stressed resting adults" Forensic Science International, 2007, pp. 1-5.
Dawes et al., "Breathing Parameters, Venous Blood Gases, and Serum Chemistries with Exposure to a New Wireless Projectile Conducted Electrical Weapon in Human Volunteers" Annals of Emergency Medicine, vol. 50, No. 3, Sep. 2007, pp. S133.
Dawes et al., "The Neuroendocrine Effects of the Taser X26 Conducted Electrical Weapon as Compared to Oleoresin Capsicum" Annals of Emergency Medicine, vol. 50, No. 3, Sep. 2007, pp. S132-S133.
Esquivel et al., "The Physiologic Effects of a Conducted Electrical Weapon in Swine" Annals of Emergency Medicine, vol. 50, No. 5, Nov. 2007, pp. 576-583.
Fish RM. Electric injury, part I: treatment priorities, subtle diagnostic factors, and burns. J Emerg Med 1999; 17(6):977-983.
Gibler WB, Runyon JP, Levy RC, Sayre MR, Kacich R, Hattemer CR et al. A rapid diagnostic and treatment center for patients with chest pain in the emergency department. Ann Emerg Med 1995; 25(1):1-8.
Gortler I, Koppl H, Stark GB, Horch RE. Metastatic malignant acrospiroma of the hand. Eur J Surg Oncol 2001; 27(4):431-435.
Hettiaratchy S, Dziewulski P. ABC of burns: pathophysiology and types of burns. BMJ 2004; 328(7453):1427-1429.
Hicks TA, McGlone JJ, Whisnant CS, Kattesh HG, Norman RL. Behavioral, endocrine, immune, and performance measures for pigs exposed to acute stress. J Anim Sci 1998; 76(2):474-483.
Holden et al., "Electromagnetic modeling of current flow in the heart from Taser devices and the risk of cardiac dysrhythmias" Physics in Medicine and Biology, vol. 52, 2007, pp. 7193-7209.
Horch RE, Bannasch H, Stark GB. Transplantation of cultured autologous keratinocytes in fibrin sealant biomatrix to resurface chronic wounds. Transplant Proc 2001; 33(1-2):642-644.
Jabre JF, Hackett ER. EMG Manual. Jabre JF, editor. teleEMG.com First, 1-75. 2002.
Jauchem et al., "Acidosis, lactate, electrolytes, muscle enzymes, and other factors in the blood of Sus scrofa following repeated Taser® exposures" Forensic Science International 161, 2006, pp. 20-30.
Jauchem, "Reply to letter to the Editor/Acidosis, lactate, electrolytes, muscle enzymes, and other factors in the blood of Sus scrofa following repeated Taser® exposures" Forensic Science International, Aug. 2006, 1 page.
Kalkan T, Demir M, Ahmed AS, Yazar S, Dervisoglu S, Uner HB et al. A dynamic study of the thermal components in electrical injury mechanism for better understanding and management of electric trauma: an animal model. Burns 2004; 30 (4):334-340.
Kenny et al., "Report of Findings: Sticky Shocker," Assessment:, Penn State, Jul. 29, 1999, NIJ 98-IJ-CX-K006.
Koscove E. The Taser: research, patients, and language (Tom Swift found). J Emerg Med 1988;6(4):343.
Kost GJ, Kirk JD, Omand K. A strategy for the use of cardiac injury markers (troponin I and T, creatine kinase-MB mass and isoforms, and myoglobin) in the diagnosis of acute myocardial infarction. Arch Pathol Lab Med 1998; 122(3):245-251.
Koumbourlis AC. Electrical injuries. Crit Care Med 2002; 30 (11 Suppl):S424-S430.
Kroll et al., "Letter to the Editor" University of Minnesota Biomedical Engineering, 2007, pp. E29-E30.
Lakkireddy et al., "Effects of Cocaine Intoxication on the Threshold for Stun Gun Induction of Ventricular Fibrillation" Journal of the American College of Cardiology, vol. 48, No. 4, Aug. 2006, pp. 805-811.
Lee RC, Gaylor DC, Bhatt D, Israel DA. Role of cell membrane rupture in the pathogenesis of electrical trauma. J Surg Res 1988; 44(6):709-719.
Lee RC, Zhang D, Hannig J. Biophysical injury mechanisms in electrical shock trauma. Annu Rev Biomed Eng 2000; 2:477-509.
Lee RC. Injury by electrical forces: pathophysiology, manifestations, and therapy. Curr Probl Surg 1997; 34(9):677-764.
Luce EA. Electrical burns. Clin Plast Surg 2000; 27(1):133-143.
Lund M, French JK, Johnson RN, Williams BF, White HD. Serum troponins T and I after elective cardioversion. Eur Heart J 2000; 21(3):245-253.
McDaniel WC, Stratbucker RA, Nerheim M, Brewer JE. Cardiac safety of neuromuscular incapacitating defensive devices. Pacing Clin Electrophysiol 2005; 28 Suppl 1:S284-S287.
McKinnon et al., "Elevation of anions in exercise-induced acidosis: a study by ion-exchange chromatorgraphy/mass spectrometry" Biomedical Chromatography, 2007, 5 pages.

Miller, "Acidosis, lactate, electrolytes, muscle enzymes, and other factors in the blood of Sus Scrofa following repeated Taser® exposures" Letter to the Editor/Forensic Science International, vol. 168, 2007, pp. e17-e18.

Ng SM, Krishnaswamy P, Morissey R, Clopton P, Fitzgerald R, Maisel AS. Ninety-minute accelerated critical pathway for chest pain evaluation. *Am J Cardiol* 2001; 88(6):611-617.

Ng SM, Krishnaswamy P, Morrisey R, Clopton P, Fitzgerald R, Maisel AS. Mitigation of the clinical significance of spurious elevations of cardiac troponin I in settings of coronary ischemia using serial testing of multiple cardiac markers. *Am J Cardiol* 2001; 87(8):994-999.

O'Brien DJ. Electronic weaponry—a question of safety. *Ann Emerg Med* 1991; 20(5):583-587.

Oltman CL, Clark CB, Kane NL, Zhang Y, Gutterman DD, Dellsperger KC et al. Coronary vascular dysfunction associated with direct current shock injury. *Basic Res Cardiol* 2003; 98(6):406-415.

Omiya et al., "Relationship between double product break point, lactate threshold, and ventilatory threshold in cardiac patient" Eur Journal App. Physiol, vol. 91, 2004, pp. 224-229.

Ordog GJ, Wasserberger J, Schlater T, Balasubramanium S. Electronic gun (Taser) injuries. *Ann Emerg Med* 1987; 16(1):73-78.

Panescu et al., "Finite Element Modeling of Electric Field Effects of Taser Devices on Nerve and Muscle" IEEE, 2006, pp. 1277-1279.

Parsons AH, Wells RE. Serum biochemistry of healthy Yucatan miniature pigs. Lab.Animal Sci. 36, 428-430. 1986.

Perry SV. The regulation of contractile activity in muscle. *Biochem Soc Trans* 1979; 7(4):593-617.

Rahko, "Evaluation of the Skin-to-heart Distance in the Standing Adult by 2-Dimensional Echocardiography" Journal of the American Society of Echocardiography, 2008, pp. 1-4.

Reichel et al., "Simulation of the Three-Dimensional Electrical Field in the Course of Functional Electrical Stimulation" Arif Organs, vol. 26, No. 3, 2002, pp. 252-255.

Rixen D, Raum M, Holzgraefe B, Schafer U, Hess S, Tenhunen J et al. Local lactate and histamine changes in small bowel circulation measured by microdialysis in pig hemorrhagic shock. *Shock* 2002; 18(4):355-359.

Robinson, M.N., Brooks, C.G., Renshaw, G.D. "Electric Shock Devices and their Effects on the Human Body." Med. Sci. Law 30(4), 1990, 285-300.

Sadhu et al., "Ventricular Fiberillation and Death After Taser Injury" Heart Rhythm, vol. 3, No. 5, May 2006, pp. S72-S73.

Tchou, "Reply" JACC, vol. 49, No. 6, Feb. 2007, pp. 733.

Valentino et al., "Acute Effects of MK63 Stun Device Discharges in Miniature Swine" Military Medicine, vol. 173, No. 2, Feb. 2008, pp. 167-173.

Valentino et al., "Neuromuscular Effects of Stun Device Discharges" Association for Academic Surgery and Society of University Surgeons-Abstracts, p. 284, 2006, p. 344.

Valentino et al., "Neuromuscular Effects of Stun Device Discharges" Journal of Surgical Research, vol. 143, No. 1, Nov. 2007, pp. 78-87.

Valentino et al., "Repeated Thoracic Discharges for a Stun Device" Journal of Trauma® Injury, Infection, and Critical Care, vol. 62, No. 5, May 2007, pp. 1134-1142.

Vilke et al., "Evaluation of In-Custody Deaths Proximal to Use of Conductive Energy Devices" Research Forum Abstracts, vol. 48, No. 4, 2006, pp. S23-S24.

Vilke et al., "Physiological Effects of a Conducted Electrical Weapon on Human Subjects" Annals of Emergency Medicine, vol. 50, No. 5, Nov. 2007, pp. 569-575.

Vilke et al., "Twelve-lead electrocardiogram monitoring of subjects before and after voluntary exposure to the Taser X26" American Journal of Emergency Medicine, Vol. 26, 2008, pp. 1-4.

Walter et al., "Taser X26 Discharges in Swine Produce Potentially Fatal Ventricular Arrhythmias" Society for Academic Emergency Medicine, vol. 15, No. 1, Jan. 2008, pp. 66-73.

Proprietary Material Not Open to Public (included in sealed envelope submitted herewith).

\* cited by examiner

Plot 1: Voltage Amplitude

Plot 2: Voltage Frequency

Plot 3: Voltage Puls Amplitude

Plot 5: Current Amplitude

Plot 7: Current Pulse Amplitude

Plot 8: Current Pulse Rise Time

Plot 9: Current Pulse Decay Time

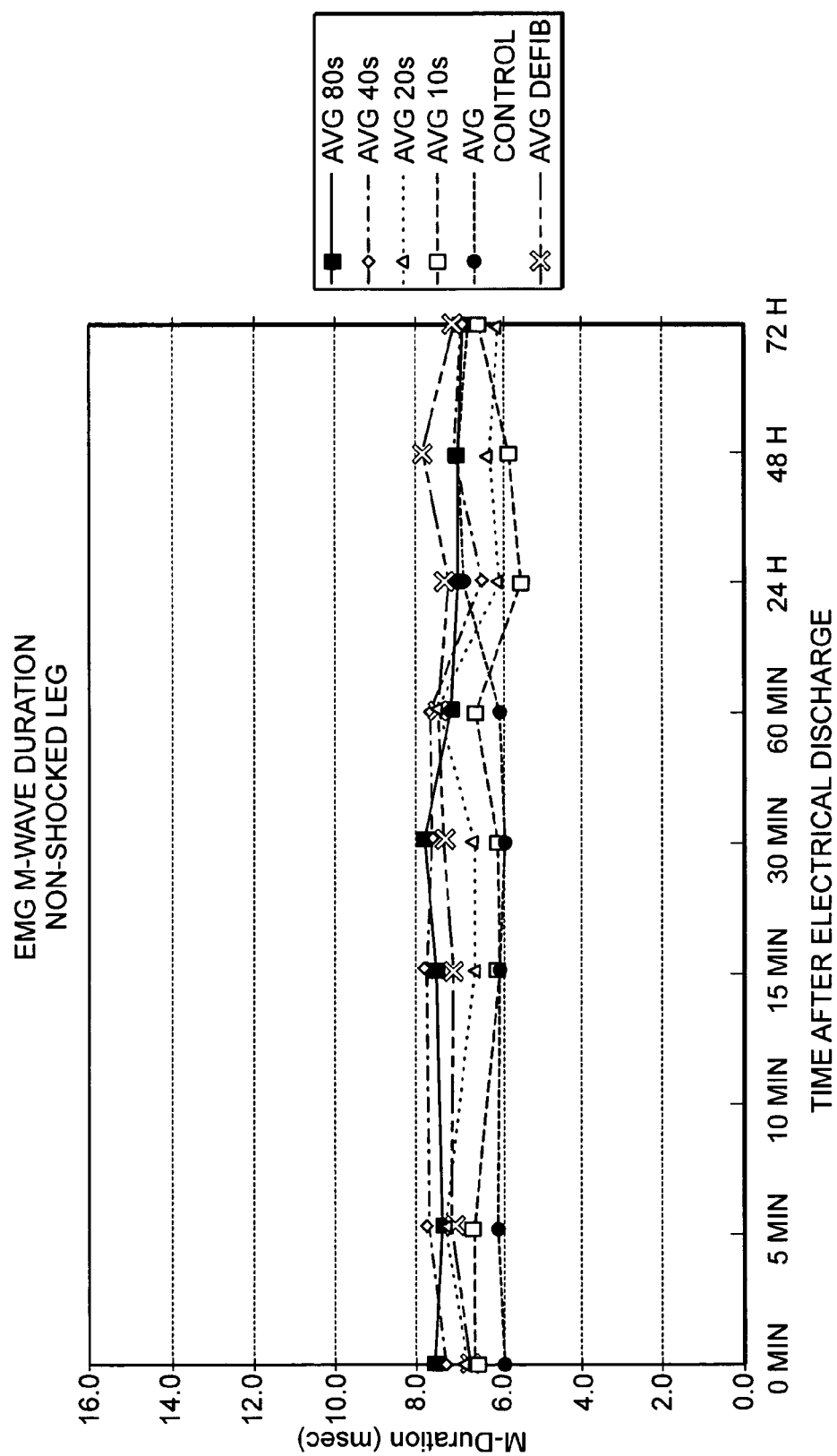

ELECTROMUSCULAR INCAPACITATION DEVICE AND METHODS

CROSS-REFERENCE TO RELATED APPLICATIONS

This application claims priority to and incorporates by reference herein in their entireties, the following: U.S. Provisional Patent Application Ser. No. 60/794,919, filed on Apr. 24, 2006; U.S. Provisional Patent Application Ser. No. 60/794,325, filed on Apr. 21, 2006; U.S. Provisional Patent Application Ser. No. 60/764,787, filed on Feb. 2, 2006; U.S. Provisional Patent Application Ser. No. 60/764,785, filed on Feb. 2, 2006; U.S. Provisional Patent Application Ser. No. 60/736,603, filed on Nov. 14, 2005; and U.S. Provisional Patent Application Ser. No. 60/736,132, filed on Nov. 11, 2005.

This application also claims priority to and is a continuation-in-part of U.S. patent application Ser. No. 11/208,762, filed on Aug. 23, 2005. U.S. patent application Ser. No. 11/208,762 is a continuation-in-part of U.S. patent application Ser. No. 10/938,553, filed on Sep. 13, 2004, now abandoned; which is a continuation of U.S. patent application Ser. No. 10/375,075, filed on Feb. 28, 2003, which issued Sep. 14, 2004, as U.S. Pat. No. 6,791,816; which is a continuation-in-part of U.S. patent application Ser. No. 10/084,972, filed on Mar. 1, 2002, which issued Nov. 4, 2003, as U.S. Pat. No. 6,643,114; all of which are incorporated by reference herein in their entireties.

FIELD OF THE INVENTION

The present invention relates generally to devices used to control and subdue a subject and, more specifically, to devices that deliver an electric waveform to a subject to induce electromuscular incapacitation (EMI).

BACKGROUND OF THE INVENTION

A number of non-lethal devices exist to subdue and control an individual, a group of individuals, or a crowd. The devices are varied in type and application, and have increased in use throughout the last decade. Common devices include the bean bag projectile, various types of pepper sprays, water cannons, rubber bullets and a variety of materials fired from conventional firearms. More recently, the use of conducted electric current to incapacitate an individual has become widely used, but has been confined generally to pistol trigger-based platforms that project puncturing barbs or needles as the delivery medium of the EMI stimulus. While the effectiveness and safety of the devices vary, this stun device or "stun gun" genre has received widespread acceptance and use.

Notwithstanding the history of stun devices, there has been little improvement or change in the EMI approach. There have been few reports of biologically-based studies that characterize specific responses to stun device stimuli or to health effects of a given stun device output with reference to nerves and muscle, both of which mediate the EMI response. Very little objective laboratory data is available describing the physiological effects of stun devices. As a result of the increased usage and deployment of EMI devices, a growing number of individuals are presenting electrical injuries related to the use of such devices and a growing number of morbidities and mortalities are being observed. Understanding the physiologic effects of high voltage, variable DC current electrical injuries will allow the mechanisms contributing to the observed morbidity and mortality to be understood and devices properly evaluated for potentially injurious side effects.

Electrical discharge produces a complex set of injuries including thermal burns, cell membrane damage and rupture, and macromolecule (protein and glycosaminoglycans) denaturation or alteration. The nature and extent of the injuries appears to be related, at least in part, to the strength and duration of the discharge, its anatomic location and path through the tissues of the body, and the characteristics of the current applied (i.e., AC, DC, mixed). The organ- and organism-level effects may include skin burns, skeletal muscle death, cardiac dysrhythmia, osteocyte and osteoblast death, blood vessel endothelium dysfunction, etc. Moreover, the application of electric currents to a live subject may cause acidosis, due to incomplete or inconsistent muscular contraction. Acidosis occurs when the body is incapable of properly clearing lactic acid build-up within areas of the body, a condition that may lead to death in extreme cases. Some types of current (e.g., direct current, DC) can cause little or no injury at low levels and increasing amounts of damage and disruption of muscle control at higher levels.

One feature of typical stun devices is the expectation of instantaneous and full incapacitation upon completion of the circuit. In the prior art, the EMI stimulus was designed to elicit a fast target response, typically above the "let-go response," after which no further increases in incapacitation are possible, other than lengthening the duration of the incapacitation while the circuit is maintained by repeated trigger pulls. In many cases, instantaneous full incapacitation may not be required or warranted, particularly in cases with vulnerable populations in which short and/or repeated periods of contact with an EMI stimulus may be preferable, or in cases where full incapacitation would put the victim at danger of falling and sustaining an injury.

SUMMARY OF THE INVENTION

It is contemplated by the inventors that studies of the physiologic effects of EMI stimuli may be crucial to developing an improved EMI device with non-injurious features for both healthy and vulnerable populations. Certain biologically-based studies may be used, for example, to improve the actual hardware-delivered EMI stimulus leading to more effective and enhanced incapacitation with less chance of permanent nerve and muscle injury to a subject. This would be particularly useful information, especially regarding subjects who may be at risk for adverse reaction to a full stun incident including the elderly, mentally disturbed, pregnant, very young, intoxicated, and otherwise health-compromised individuals. It would be highly desirable to have an optimized, non-subcutaneous, point-of-contact EMI capacity suitable for use on a wide variety of persons and in various circumstances.

The present invention offers improvements over typical stun gun systems by offering a locationally precise point-of-contact capability of variable duration and incapacitation effect using an improved EMI stimulus based on biologically relevant studies.

An optimized electrical output signal is based on a frequency cycle from greater than about 50 to 1000 Hz, a voltage of from about 100 V to 100 kV, and total charge output of from about 20 to 1,500 μCoulombs affording effective and non-injurious incapacitation relative to systems operating with typical parameters. Experimental indications of the improved EMI stimulus are provided hereinbelow. Due, however, to the beneficial results associated with the optimized electrical output signal, the signal and associated signal-generating circuitry can be used in any delivery device or apparatus including, but not limited to, projectile firing stun guns, batons, and similar devices.

The improved device utilizes electrical current waveforms to maximize neuromuscular mechanisms responsible for EMI and minimize local tissue damage or deleterious and non-reversible general responses which result from local tissue damage.

Objects of the invention include delivery of optimum electrical waveforms and amplitudes for EMI that elicit the desired response with minimal or complete absence of permanent nerve and muscle injury. Because skeletal muscle, cardiac muscle, and nerve tissues are most sensitive to electrical forces used to determine the effect of EMI, the survival and function of these tissues is important over a range of time after electrical shock to provide assurances for measures of safety and health effects.

In one aspect, the invention relates to an EMI device for providing an electrical stimulus signal with an optimum electric waveform and amplitude to produce selectively an electric charge of stunning capability. Embodiments of the above aspect may include the following, individually and in various combinations: (a) any of the series of pulses having different frequencies out of which at least one pulse has a repetition rate in the range of about 5-1000 pulses per second (i.e., Hz); (b) pulse duration that ranges from about 3-1000 microseconds; (c) pulse ionization potential that delivers charge in the range of about 20 microcoulomb to 1500 microcoulomb; (d) pulses which vary in shape such as sinusoidal, square, triangular or sawtooth; (e) energy content which ranges from about 0.001-0.5 joule/pulse; (f) RMS current in ranges smaller than about 400 mA; (g) duty cycle of about 0.005% to 5%; (h) circuitry that utilizes solid state semiconductors for pulse power switching for improved switching speed, high reliability, low degradation, lengthened life, low cost, high repetition rate, low losses, and high voltage and current rating over conventional capacitor discharge topologies (e.g. thyratron, ignitron, or spark gap); (i) at least two electrodes; and (j) voltage in the range of about 100 V-100 kV.

In another aspect, the invention relates to a method of temporarily incapacitating a subject, the method having the steps of generating a pulsed, lower power electric waveform, and applying the pulsed, low-power electric waveform to a subject at a frequency and over a time period sufficient to induce involuntary muscular contraction with non-injurious muscle effects. In embodiments of the above aspect, due to application of the waveform, the non-injurious muscle effect is a myoglobin concentration value substantially unchanged relative to a control. In other embodiments, the non-injurious muscle effect is a CK-MB concentration value substantially unchanged relative to a control, and/or a troponin I concentration value substantially unchanged relative to a control. In other embodiments, due to application of the waveform, the involuntary muscular contraction results in limited lactic acid production, which may be a lactic acid concentration of a subject that is substantially unchanged relative to a control.

Certain embodiments utilize a waveform frequency in a range of about 40 Hz to about 80 Hz, more specifically, about 50 Hz to about 70 Hz, and even more specifically 67 Hz and/or 60 Hz. In other embodiments of the above aspect, the involuntary muscular contraction is characterized by substantially complete tetany or partial tetany. In certain embodiments, the waveform utilizes a peak voltage of less than about 1 kV and/or a peak current of less than about 1 A. In other embodiments, the time period of the waveform is about 5 ms, and its duty cycle may be between about 0.005% to about 5%.

In another aspect, the invention relates to an apparatus for temporarily incapacitating a subject, the apparatus including a circuit for generating a pulsed, low-power electric waveform having a frequency and over a time period sufficient to induce involuntary muscular contraction with non-injurious muscle effects, a plurality of electrical contacts for delivering the waveform to a subject, and a switch to selectively activate the circuit. In certain embodiments of the above aspect, each contact may be at least one of a pad, a button, a nub, a prong, a needle, and a hook. Other embodiments include a release mechanism for releasing the plurality of contacts from the apparatus. In still other embodiments of the above aspect, the contacts deliver the waveform to a subject subcutaneously, or deliver the waveform to an outer surface of a subject. Other embodiments include an elongate body having a first end and a second end, wherein the contacts are located proximate the first end and the switch is located proximate the second end.

In yet another aspect, the invention relates to a pulsed, low-power electric waveform adapted for temporarily incapacitating a subject, the waveform including a substantially square shape profile, a frequency having a value in a range of about 40 Hz to about 80 Hz, and a peak voltage of about less than about 1 kV, wherein applying the waveform to a subject over a time period induces involuntary muscular contraction with non-injurious muscle effects. In certain embodiments of the above aspect, due to application of the waveform to a subject, the non-injurious muscle effect includes a myoglobin concentration value substantially unchanged relative to a control, a CK-MB concentration value substantially unchanged relative to a control, and/or a troponin I concentration value substantially unchanged relative to a control. In other embodiments, due to application of the waveform to a subject, the involuntary muscular contraction results in limited lactic acid production, and/or a lactic acid concentration of a subject that is substantially unchanged relative to a control.

In other embodiments of the above aspect, the waveform frequency may be a value in a range of about 50 Hz to about 70 Hz, or may be about 67 Hz, or about 60 Hz. In other embodiments, the involuntary muscular contraction may be characterized by substantially complete tetany or partial tetany. In certain embodiments, the waveform utilizes a peak voltage of less than about 1 kV and/or a peak current of less than about 1 A. In other embodiments, the time period of the waveform is about 5 ms, and its duty cycle may be between about 0.005% to about 5%.

BRIEF DESCRIPTION OF THE FIGURES

The foregoing and other objects, features, and advantages of the present invention, as well as the invention itself, will be more fully understood from the following description of various embodiments, when read together with the accompanying drawings, in which:

FIGS. 4A-4I are plots of test results of a signal generated by an EMI device utilizing the circuit of FIGS. 3A-3B;

FIGS. 7A-7D are graphs of the acute effects on a non-stimulated limb of a subject, wherein the subject is stimulated by an electrical waveform generated by the circuit of FIGS. 3A-3B;

DETAILED DESCRIPTION

Figure 1A:
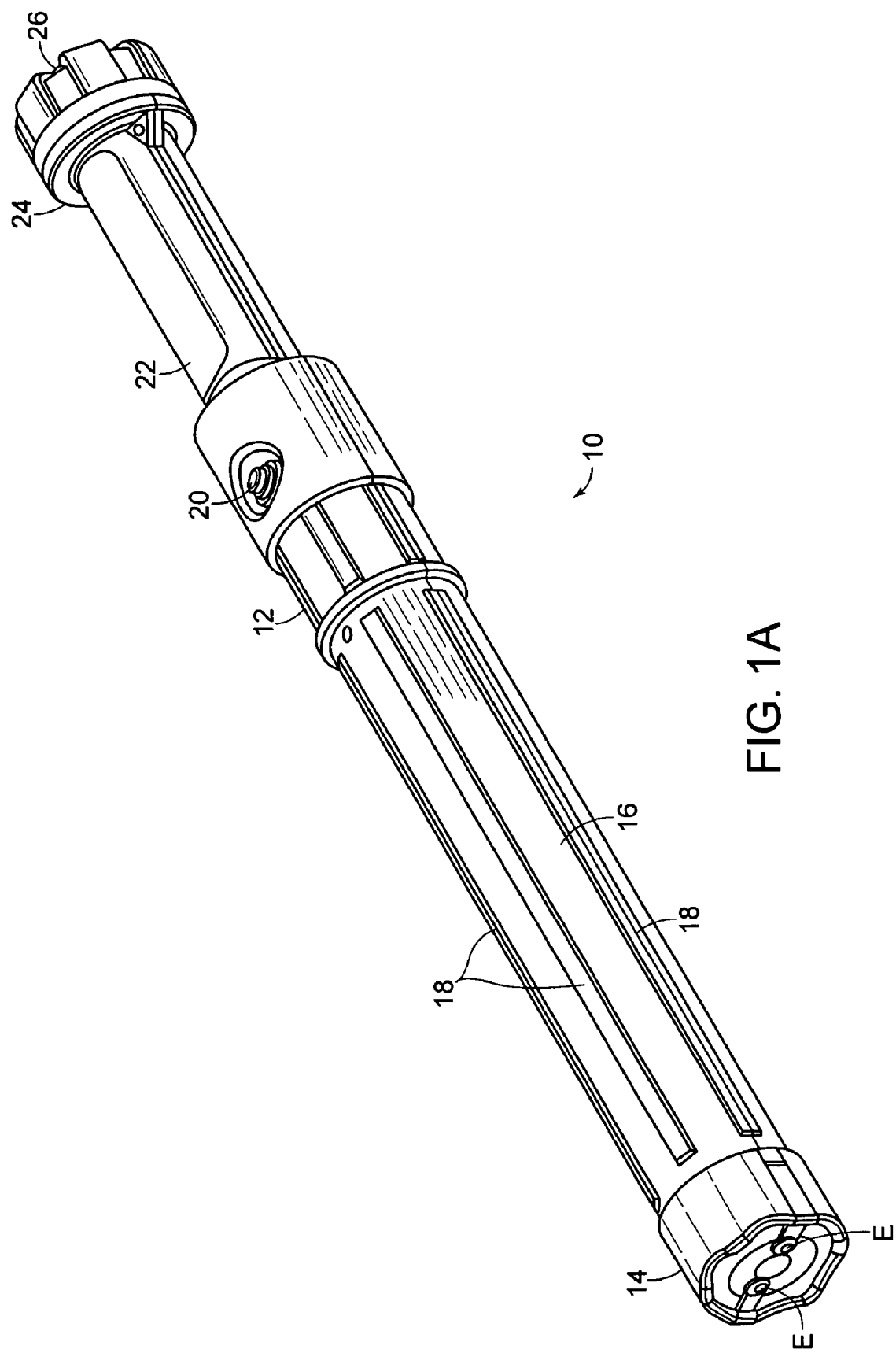
FIG. 1A is a schematic perspective view of an EMI device in accordance with one embodiment of the present invention.

One embodiment of a hand-held EMI device 10 in a baton configuration is depicted in FIG. 1A. The device 10 is constructed of an elongate, generally hollow shaft 12 having a discharge end cap 14, with two electrodes E mounted thereon. Extending from the discharge end cap 14 is an impact portion 16, which allows the device 10 to be used for close-quarters offensive or defensive maneuvers. The impact portion 16 is generally hollow to contain the EMI device's electronic components, and also may include impact ribs 18 extending lengthwise along the outer circumference of the impact portion 16. The impact ribs 18 provide additional structural reinforcement along the length of the impact portion 16, and may be integrally formed with the impact portion 16. Alternatively, the impact ribs 18 may be constructed of a different material and secured to the impact portion 16 by any mechanical or chemical means.

A button or switch 20 that controls the internal EMI circuitry is located on the device 10, usually near a handle portion 22, such that the switch 20 may be activated by a user's thumb or finger, while the device 10 is being grasped. A butt end portion 24 is located at the end of the device 10 opposite the discharge end cap 14. The butt end portion 24 may include screw threads (FIG. 1B) or other structure for securing a butt end cap 26. The butt end cap 26 may be removed to allow access to, for example, batteries or other internal electronic components. The butt end cap 26 may also function as a weighted counterbalance to allow the device 10 to be held and controlled with ease. For example, a longer device would allow a user to apply an EMI waveform (via the electrodes E) at a further distance from a target, but may make the device more awkward to control. A weighted butt end cap would offset the weight of such an elongated device.

Figure 1B:
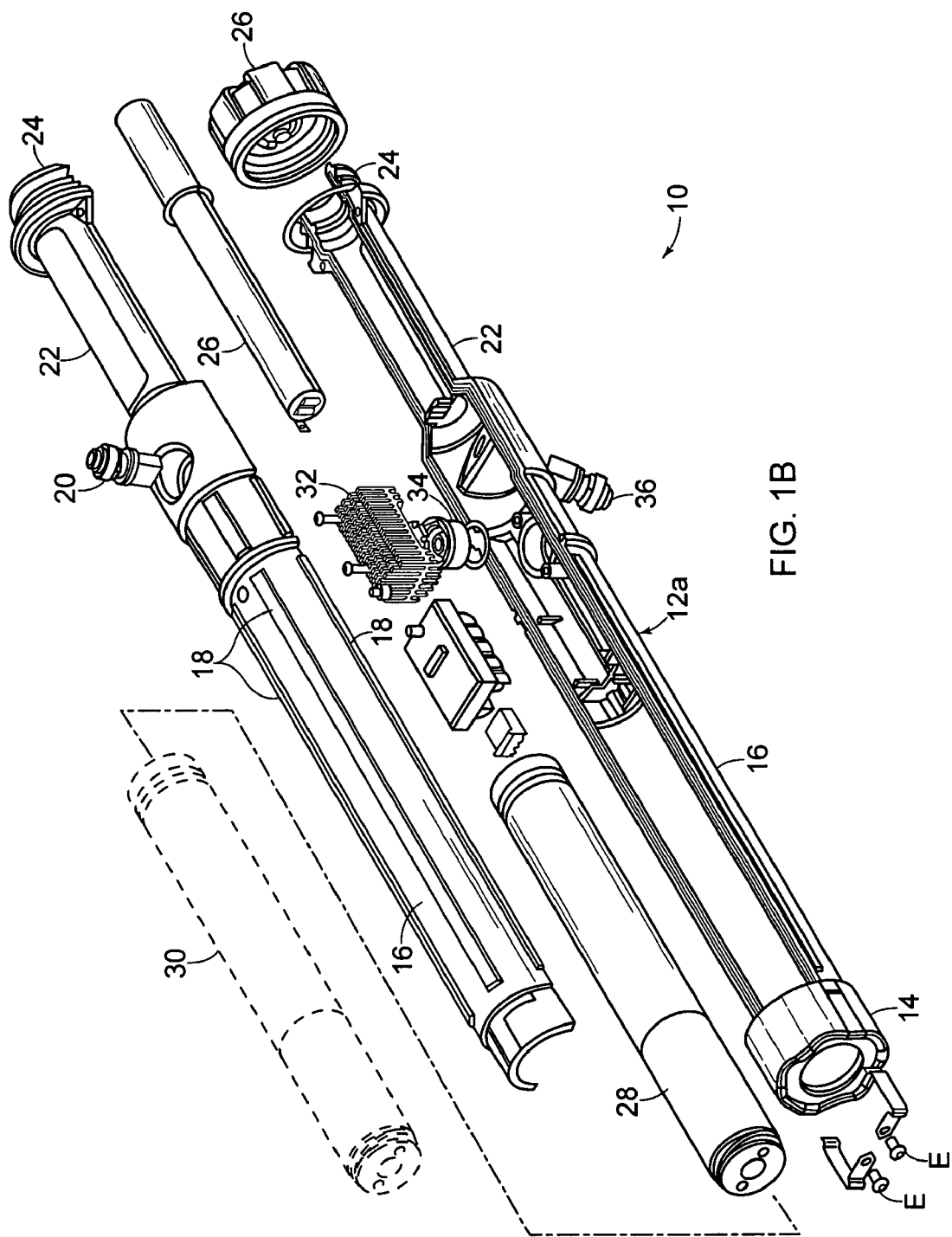
FIG. 1B is an exploded schematic perspective view of the EMI device of FIG. 1A.

FIG. 1B depicts an exploded perspective view of the device 10 of FIG. 1A. The device 10 is constructed of two substantially identical main outer components 12a, 12b joined lengthwise to form a solid shaft 12, though other suitable configurations and constructions are contemplated. An electric stun module 28 is contained within the shaft 12. The stun module 28 may be replaced with alternate modules 30, e.g., high intensity light-emitting devices, sound-emitting devices, irritant spray discharge devices, etc. Such optional modules, and other optional components (exterior shaft cutting or abrading surfaces, lights, etc.) may be incorporated in embodiments of the device described herein. Such optional elements are described in more detail in U.S. patent application Ser. No. 11/208,762; U.S. patent application Ser. No. 10/938,553; U.S. Pat. No. 6,791,816; and U.S. Pat. No. 6,643,114, the disclosures of all of which are incorporated by reference herein in their entireties.

A battery pack 26 provides the power to operate the electric stun module 28, or any alternate modules 30, as required. If required or desired, an internal heat sink 32 may also located within the shaft 12. One or more lights or LEDs 34 may be visible through the wall of the shaft 12, and may be wired to operate as desired for a particular application. For example, the LED 34 may be constant-on, flashing, multi-colored, etc., as desired to provide visual indication of the status of the device ("low-power," "operating," "service required," "circuit failure," "ready," etc.). An additional button or switch 36 may also be located on the device 10 and may be used as a safety, requiring both buttons 20, 36 to be pressed for the electric stun module 28 to be activated. Alternatively or additionally, one of the buttons may function as an ON switch, with the second button functioning as an OFF switch. Either or both of the buttons may be used to increase the intensity, duration, etc., of the electric output of the device 10. Other uses and functionality are apparent to one of ordinary skill in the art.

More specifically, and with respect to a particular embodiment, depressing and releasing the button 20 turns the electrical circuit on, and the waveform is generated. Depressing and releasing the button 20 a second time turns the device off. When the device is on and the waveform is being generated, the button 36 operates as a momentary switch, temporarily breaking the circuit while the button 36 is depressed. Releasing the button 36 turns the device back on.

Figure 1C:
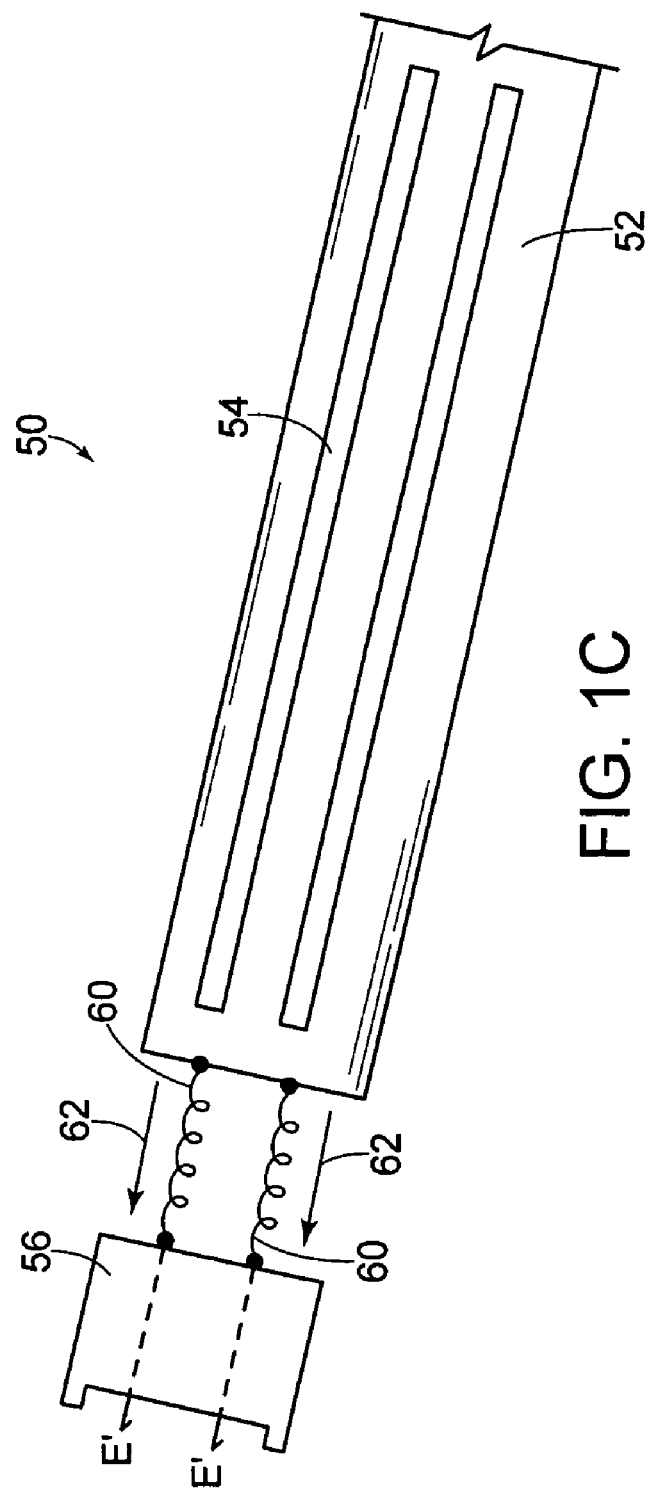
FIG. 1C is a partial schematic side view of an EMI device in accordance with one embodiment of the present invention.

Although a baton-type stun device is depicted in FIG. 1A, other stun device platforms are also contemplated. For example, the circuit depicted in FIGS. 3A-3B may also be utilized in the "stun gun" platform, wherein tethered darts are launched or otherwise shot from a usually hand-held, pistol-type deployment device. FIG. 1C depicts such an embodiment of a releasable stun device 50. The device 50 consists of a shaft 52, which may be hollow to contain the desired electrical components, as depicted in FIG. 1B. Impact ribs 54 may be located on the outer surface of the shaft 52, if desired, or the shaft may define a portion of the "barrel" of a stun gun. A releasable end cap 56, or electrodes E' themselves may be releasable from the end of the shaft 52. The electrodes E' are connected via conducting tethers 60 to the internal circuitry of the device 50, allowing the EMI device 50 to be utilized at a distance from a subject. The releasable end cap 56 or electrodes E' may be forcibly expelled 62 from the shaft 52 by some launching mechanism, such as a spring or pneumatic charge, or may be passively released once the barbed electrodes E' attach to the skin or clothing of a subject. Additional details regarding types of electrodes are described with regard to FIGS. 2A-2D, below. Other devices for launching tethered electrodes are known in the art.

Figure 2A:
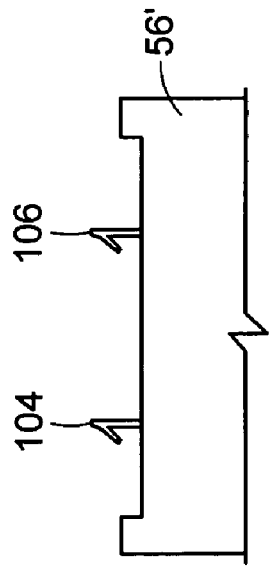
FIGS. 2A-2D are schematic side views of EMI device electrodes in accordance with several embodiments of the present invention.
Figure 2D:
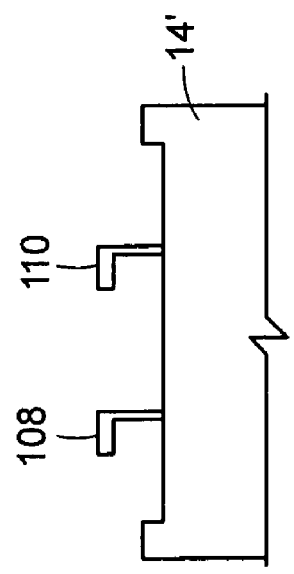
Figure 3A:
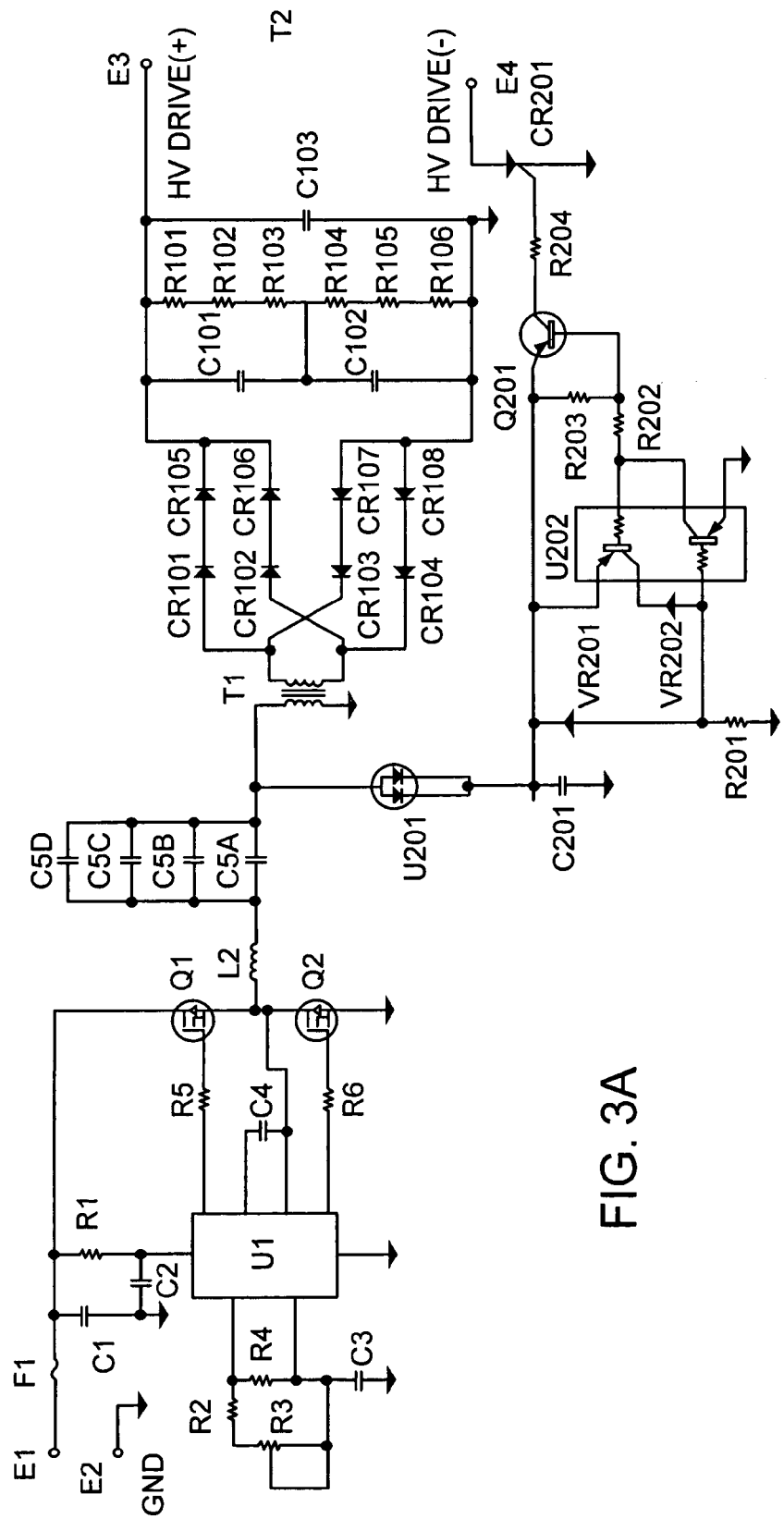
FIG. 3A-3B are electrical schematic diagrams of an electric waveform generator in accordance with one embodiment of the present invention.
Figure 3B:
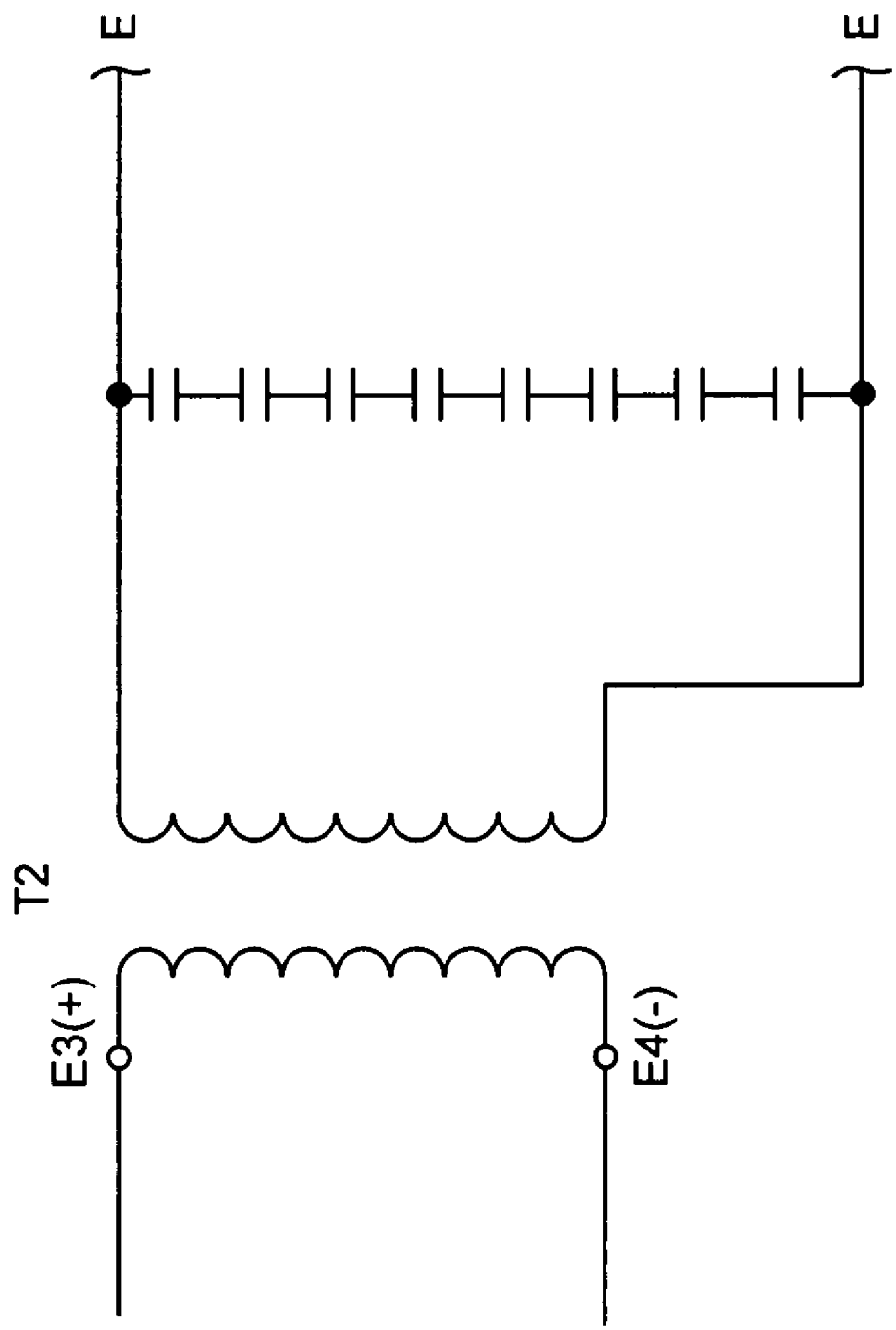

Additionally, the circuit of FIGS. 3A-3B may be utilized in other implements that appear less "offensive" in nature than a gun or baton. Such applications include belts worn by inmates in environments that require them to appear in public (e.g., courthouses, transport vehicles, etc.) while securing the public against any harmful or threatening actions by the inmate. In such applications, the stun belt could be worn under clothing to prevent it from being visible by persons who may be influenced by its presence (a jury pool, for example). Such a device could be operated remotely to safeguard the public from the individual. Additionally, electrodes may be located on the fingertips or palm of an electrically insulated glove to provide for more discreet deployment by a user. In such a case, the battery pack and circuitry may be located remote from the electrodes (e.g., on a belt or in a pocket), and connected thereto with wires routed through clothing. The user could simply activate the circuit while touching a subject to achieve the desired incapacitation response. In the belt and glove embodiments, the low profile electrode embodiments depicted in FIGS. 2A and 2D (described below) may be useful to allow the device to be used without prolonged penetration of the skin of a wearer (in the case of the belt) or accidental penetration of the skin of a user (in the case of the glove).

Figure 2C:
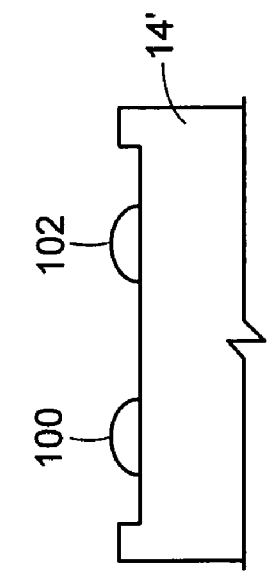
Figure 2B:
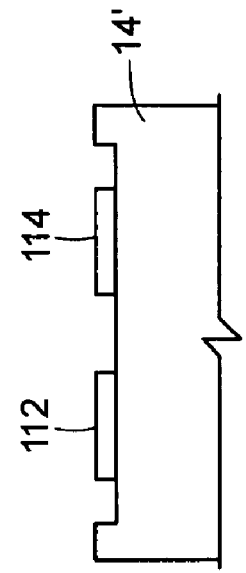

FIGS. 2A-2D depict various embodiments of the electrodes that may be utilized with an EMI device of the present invention. FIG. 2A depicts electrodes 100, 102 having a generally convex outer shape and low overall profile. The electrodes 100, 102 may be round, oblong, or any other shape desired for a particular application. The radius of curvature of the outer surface of the electrodes 100, 102 may vary depending on application, but generally may have a curvature that prevents penetration of the skin. The electrodes 100, 102 are depicted in this figure located on a discharge end cap 14', but, as noted above, these low profile electrodes may be utilized in other devices where penetration of the skin by electrodes is neither required nor desired. FIG. 2B depicts electrodes 104, 106 having a generally barbed or hooked shape. In certain applications, especially those that require the electrodes to remain fixed to the subject, electrodes that penetrate skin or clothing may be required. Such electrodes may be barbed or otherwise hooked to prevent inadvertent or deliberate removal by a subject. During use, the barbs or hooks penetrate the clothing and/or skin of a subject and are retained thereon, allowing a user to continue to deliver incapacitating waveforms, should the subject attempt to move away from the device. The barbed electrodes 104, 106 are also useful for embodiments of the stun device that utilize a releasable end cap 56' and fire the electrodes at a subject or otherwise release the electrodes from the body of the device, as described with regard to FIG. 1C. Moreover, although the barbed electrodes are described above as used in conjunction with releasable discharge heads, or as being themselves releasable, barbed electrodes may also be used with non-releasable embodiments of a stun device.

FIG. 2C depicts blunt-tipped electrodes that may contact the skin or clothing of a subject without a substantial risk of penetration the surface. The electrodes 108, 110 may be mounted on springs within the discharge end cap 14', so as to retract when pressed against a subject, thus limiting or preventing penetration. FIG. 2D depicts another embodiment of low-profile electrodes 112, 114, similar to the electrodes of FIG. 2A, but with a larger surface area, such that penetration of the skin surface of a subject is mitigated or eliminated. The electrodes 112, 114 are depicted in this FIG. located on a discharge end cap 14', but, as noted above, these low profile electrodes may be utilized in other devices where penetration of the skin by electrodes is neither required nor desired.

An exemplary electrical system utilized in the stun module 28 is depicted in FIGS. 3A-3B. The circuit of FIGS. 3A-3B employs silicon controlled rectifier (SCR) technology, rather than using the spark gap principle as in other devices, although circuits utilizing spark gap principle may be used in certain embodiments of the device. It will be understood that the circuit of FIGS. 3A-3B may be used without a replaceable module, e.g., to replace stun circuits in conventional, permanently-wired stun devices.

The circuit of FIG. 3A receives power from the two contacts E1 and E2, which provide power from the battery pack 26, which may be a 12-volt lithium ion battery, an equivalent, or other power source. Electrical power passes through a fuse F1 and filtering circuit C1, C2, and R1 to a bridge driver controller integrated circuit U1, which contains an oscillator and a pair of metal oxide semiconductor field effect transistor (MOSFET) drivers. R4 and C3 set a switching frequency for a high-voltage switching converter. Two MOSFET devices Q1 and Q2 are switches, which alternately charge and discharge the capacitor group C5A through C5D to drive the high voltage transformer T1. Coil L2 limits the charging current. The transformer steps up the voltage to a desired level, e.g., a 290:1 ratio. The alternating current from the transformer T1 is rectified by high voltage diodes CR101 through CR108, employed in a bridge-type circuit. Output from the diode bridge CR101 through CR108 charges the capacitor C103.

Primary voltage from the transformer T1 is sensed by U201 and C201. When voltage at the primary of the transformer T1 exceeds a predetermined limit, a fast gate driver circuit built around Q201 provides a pulse of current to the gate of SCR CR201, turning the SCR on. This circuit provides a rapid turn-on for the SCR for minimal losses between the capacitor C103 and the step-up side of the transformer T1. Once triggered, the SCR stays on until the output capacitor C103 discharges to a low voltage. Primary input leads of a high voltage transformer T2 are soldered to E3 and E4. The use of an SCR to control the rapid switching of the circuit, rather than a conventional spark gap switch, results in a device having a much longer lifespan than the conventional spark gap driven device. The above-described circuit as shown in FIG. 3A of the drawings is preferably "potted" or encapsulated in a plastic resin or other suitable material for greater durability when the device 10 is used as an impact weapon. In addition to ON/OFF control provided by the switches, the circuit may also include a time delay function, which allows the circuit to maintain the generated waveform for a predetermined period each time a switch is pressed. This time period may be factory- or user-configurable, as desired.

More specifically, and with respect to a particular embodiment, the unit is a high-voltage switching converter, which produces an output voltage high enough to cause an arc across a pair of electrodes. The converter operates from a 12 VDC lithium ion battery. It produces a 50 kV pulsed output, limited by the breakdown of air across a pair of electrodes. The arc, or breakdown of air, occurs at about 60 Hz and creates a continuous stream of bright intense light and a loud audible noise. In this embodiment, capacitors C101 and C102, and resistor R4 are not present in the circuit of FIG. 3A.

The input consists of a resettable fuse, F1, followed by a 2200 µF electrolytic capacitor, C1. The resettable fuse performs two functions: it limits inrush current during application of input power and provides protection from reverse battery polarity. The capacitor provides a low impedance source and filters the converter switching current. With a fully-charged battery, the input current is 0.8 A and draws less than 10 W of input power. As the battery drains, the arc rate reduces, which results in reduction of input power. See Table 1, below, for the arc rate as a function of battery voltage. A fully charged battery will last one hour with continuous operation. Alternatively, feedback circuitry may be utilized to govern the repetition rate of the oscillator and, therefore, regulate the frequency of the generated signal to a constant level.

TABLE 1

Arc Rate vs. Battery Voltage

| Battery Voltage (V) | Battery Current (A) | Arc Rate (mS) | Arc Rate (Hz) |
|---|---|---|---|
| 12.0 | 0.81 | 16 | 63 |
| 11.0 | 0.78 | 18 | 56 |
| 10.5 | 0.76 | 20.5 | 49 |
| 10.0 | 0.74 | 23.5 | 43 |
| 9.75 | 0.72 | 25 | 40 |
| 9.50 | 0.70 | 26 | 39 |
| 9.25 | 0.68 | 27 | 37 |
| 9.00 | 0.65 | 29 | 35 |
| 8.75 | 0.53 | 44 | 23 |
| 8.55 | 0.44 | 54 | 19 |

The converter is a half bridge, series loaded configuration. This topology efficiently charges the output capacitor, C103. The series inductor, L2, limits the charging current. The inductance value and the switching frequency determine the rate of charging current. A bridge driver controller integrated circuit, U1, contains an oscillator and a pair of MOSFET drivers. R4 and C3 set the switching frequency to 30 kHz. Q1 and Q2 are MOSFET switches which drive the high voltage transformer, T1. The switches are configured in series across the input source. They switch alternately at a near 50% constant duty cycle. When Q1 switches on, the input source delivers power to the transformer and charges C5A-D. When Q2 switches on, C5A-D discharges to the transformer. The transformer is thus driven alternately in both directions, producing a 30 kHz AC output. The transformer has a step up ratio of 290. The output of the transformer is rectified by high voltage diodes configured in a bridge arrangement, which charges a 0.15 µF 1600V capacitor, C103, to 1500 V. The primary voltage of the T1 transformer is sensed and is set to trigger SCR, CR201 when the voltage reaches 5.2V. A fast gate driver circuit provides a pulse of current to the gate of the SCR causing a fast turn on. This rapid turn on is necessary for a low loss energy transfer from capacitor, C103, to the step-up (1:63) high voltage transformer. This ratio will produce a pulse output of greater than 50 kV. The electrodes are spaced to arc at a voltage below 50 kV.

FIG. 3B depicts the waveform generator circuit from transformer T2 to the output electrodes E. The secondary output leads of T2 are soldered to eight 390 pF, 3 kV capacitors configured in series. The secondary leads are also soldered to the output electrodes E, which deliver the final output waveform to a subject. The amount of output capacitance determines the intensity and duration of the arc. When the output capacitors discharge to a low voltage, the arc extinguishes, the SCR resets to an off state, allowing the charge cycle to repeat. The charge period is about 60 Hz for a fully charged battery.

Some existing stun devices utilize a spark gap as the switch to drive the high voltage transformer; some such spark gaps are rated to operate reliably for a minimum of 3,000,000 cycles. At 60 Hz, this would equate to less than 14 hours of continuous operation. The SCR switch described herein may be more reliable than the existing spark gap designs, even though there are more components required to drive the SCR. Unlike the spark gap, the SCR does not have a wear out mechanism and may operate for more than 10 years of continuous operation. Another advantage using the SCR is the arc rate can be increased to greater than 100 Hz and maintain thermal stability.

Figure 3C:
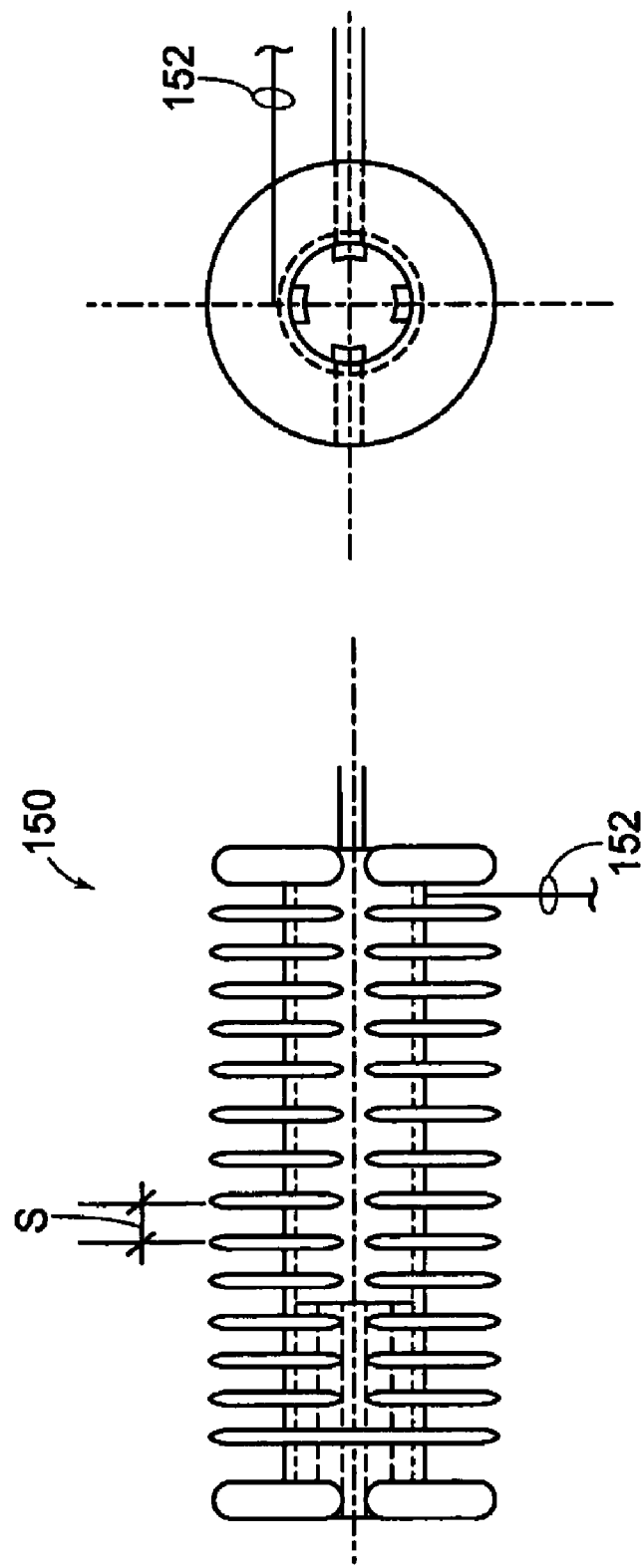
FIG. 3C is a schematic side and end view of a high voltage bobbin for use in an electric waveform generator circuit in accordance with one embodiment of the present invention.

FIG. 3C depicts a bobbin 150 utilized in the circuit depicted in FIG. 3B. This bobbin 150 is configured to maintain a known minimum physical separation S between windings of transformer wire 152, which is wrapped around the bobbin 150. This has the effect of limiting the maximum voltage between any two adjacent wires to a value less than that which may cause an electrical short inside the transformer. This minimum physical separation S between wires 152 combined with the use of a high dielectric encapsulating polymer ensures a reliable high power output transformer.

Figure 4A:
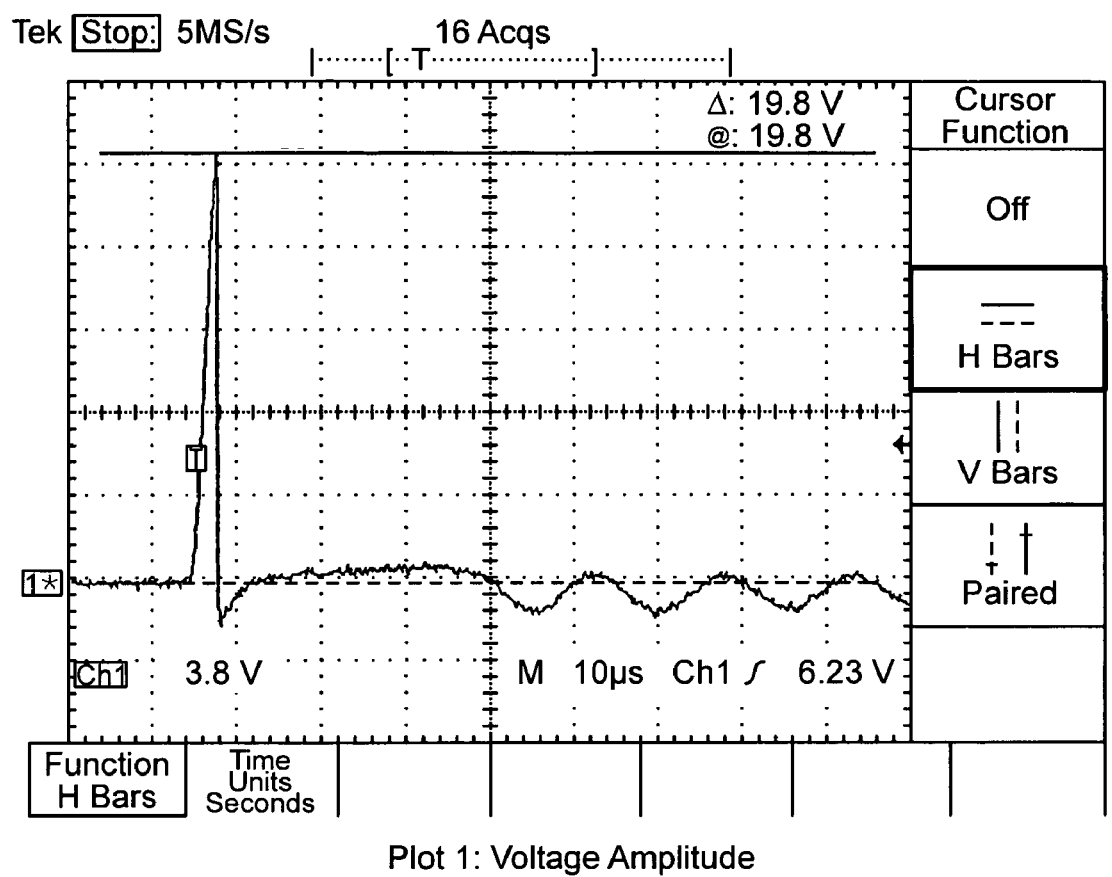
Figure 4B:
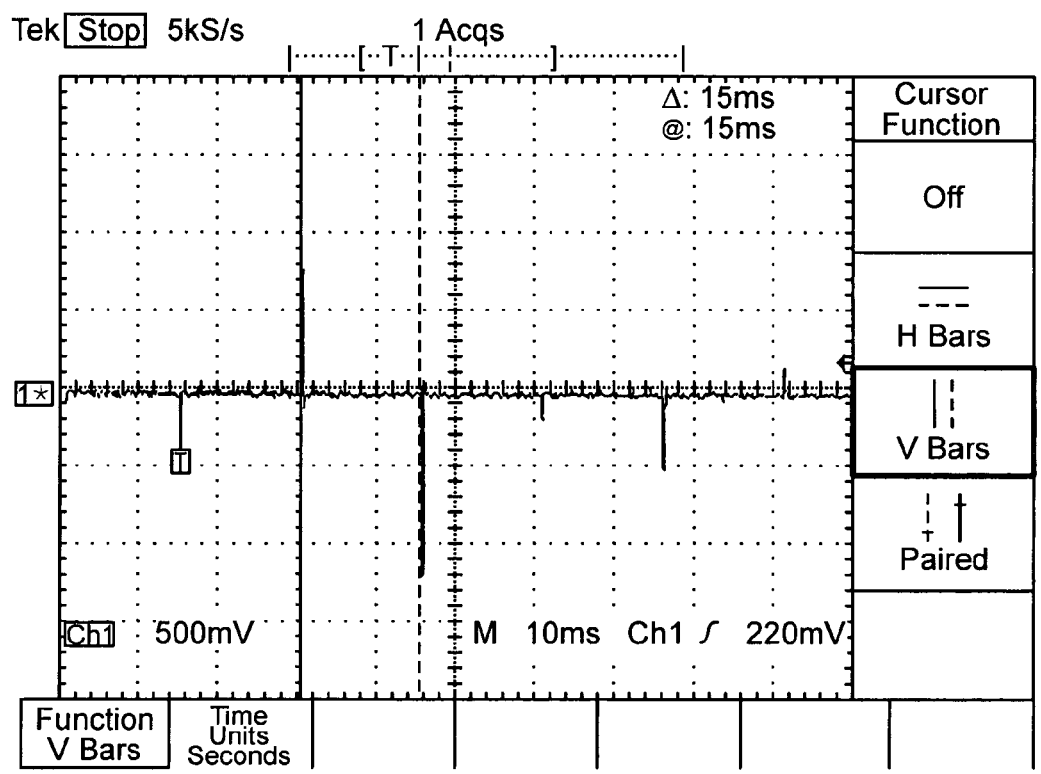
Figure 4C:
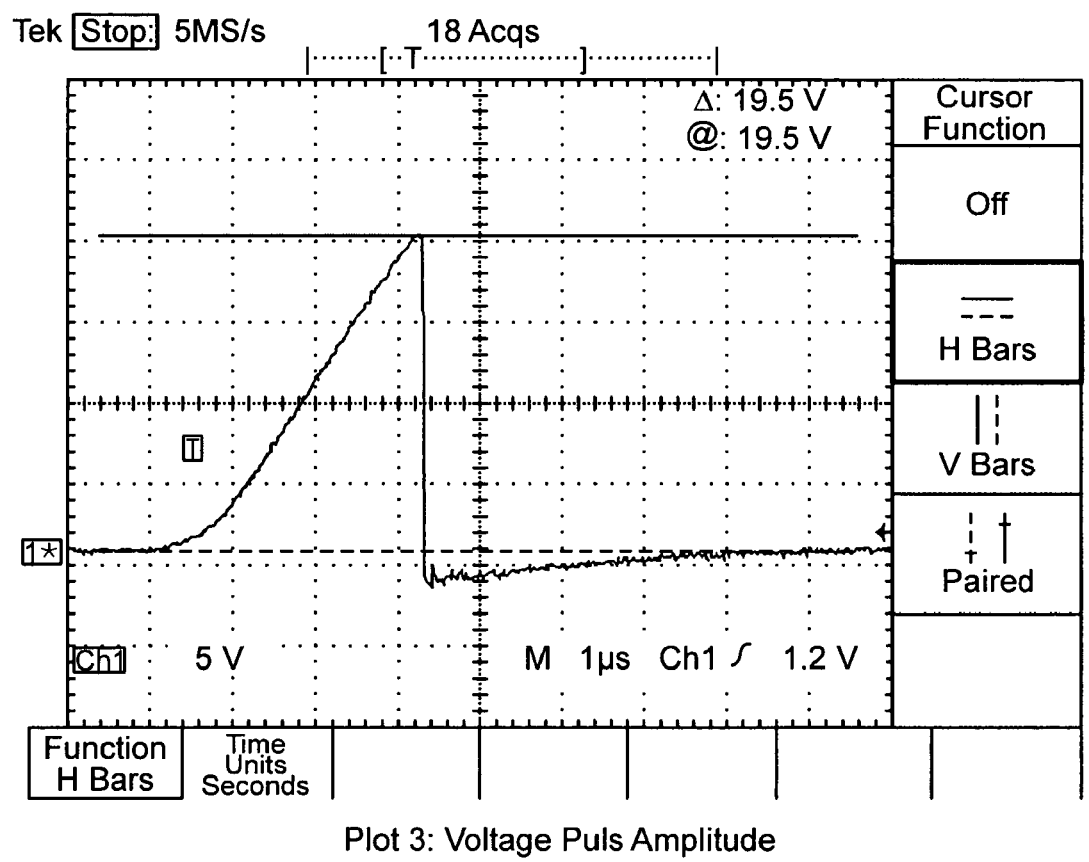
Figure 4D:
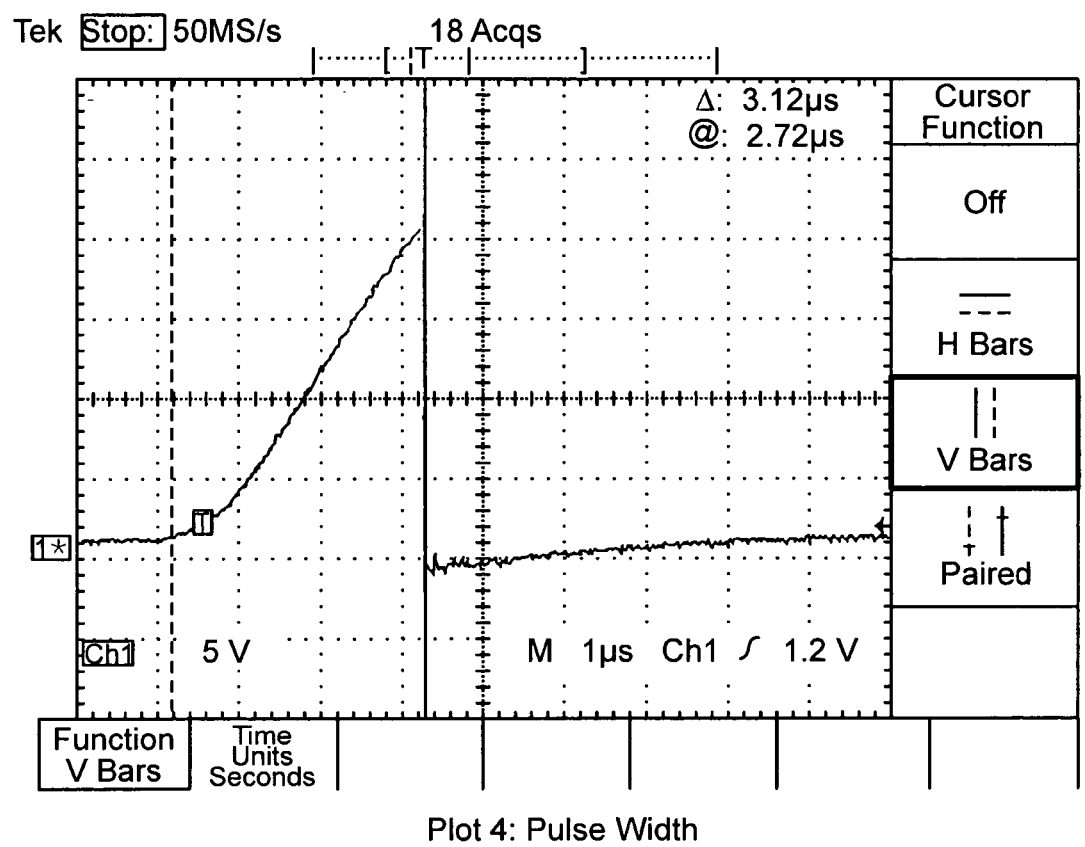
Figure 4E:
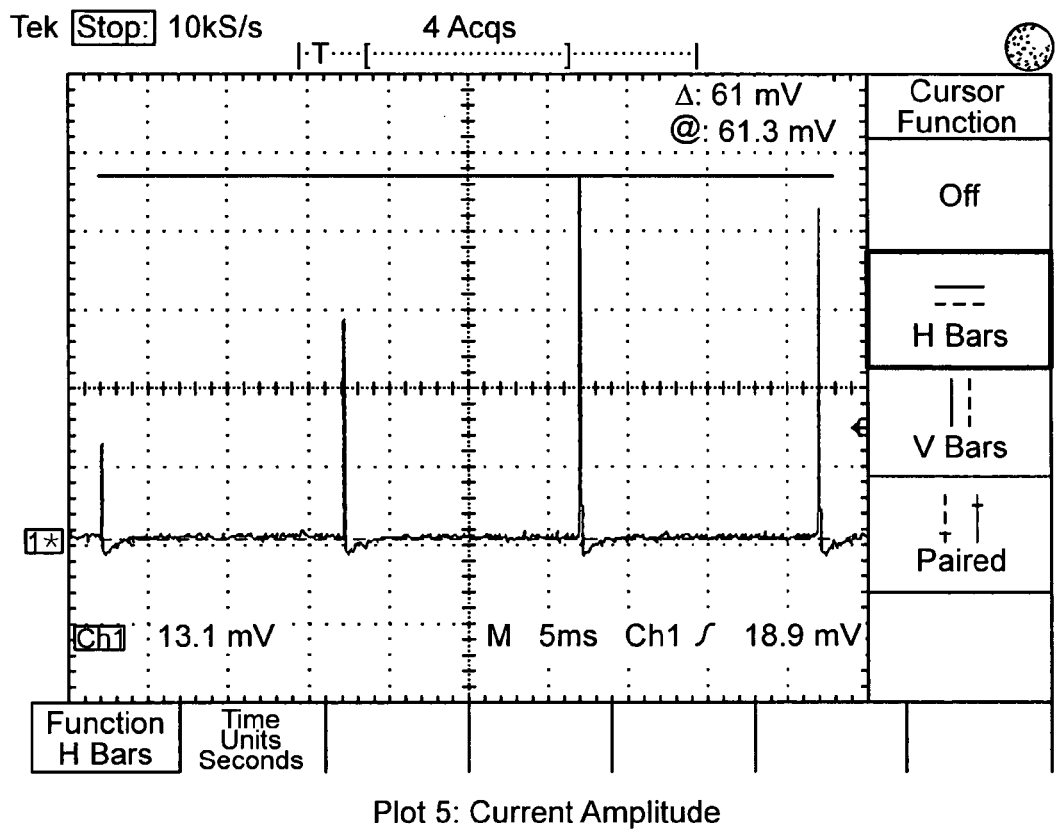
Figure 4F:
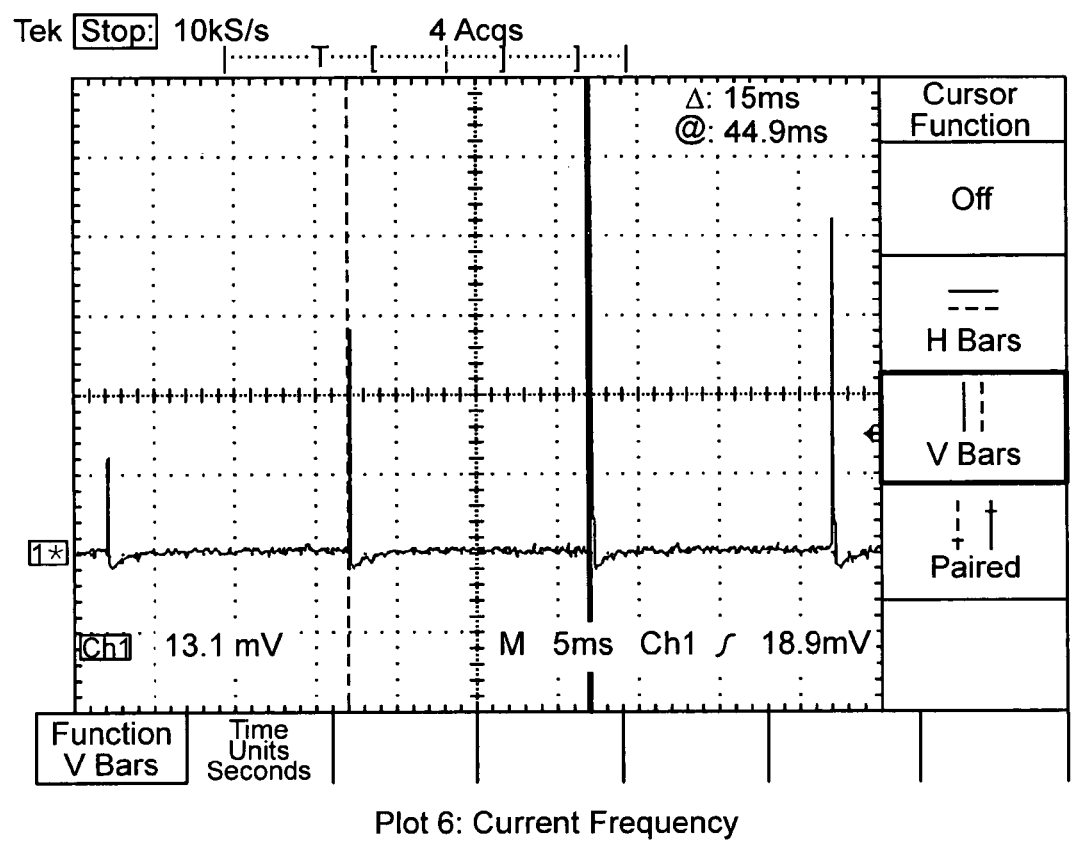
Figure 4G:
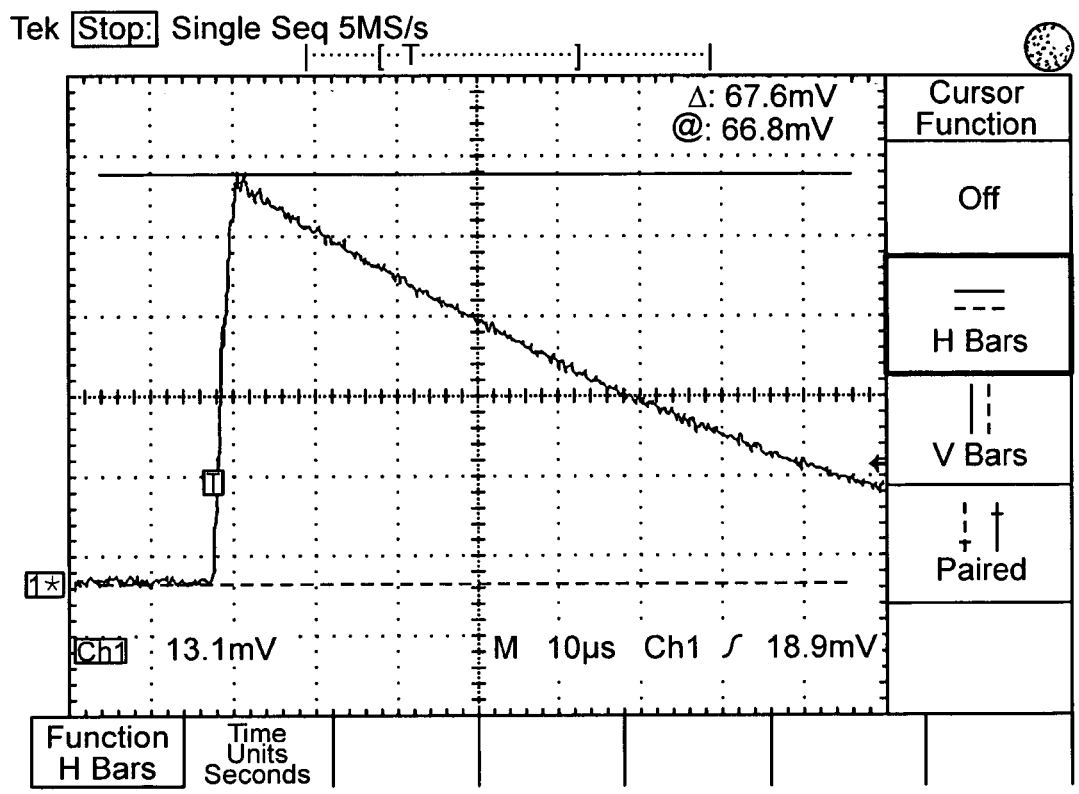
Figure 4H:
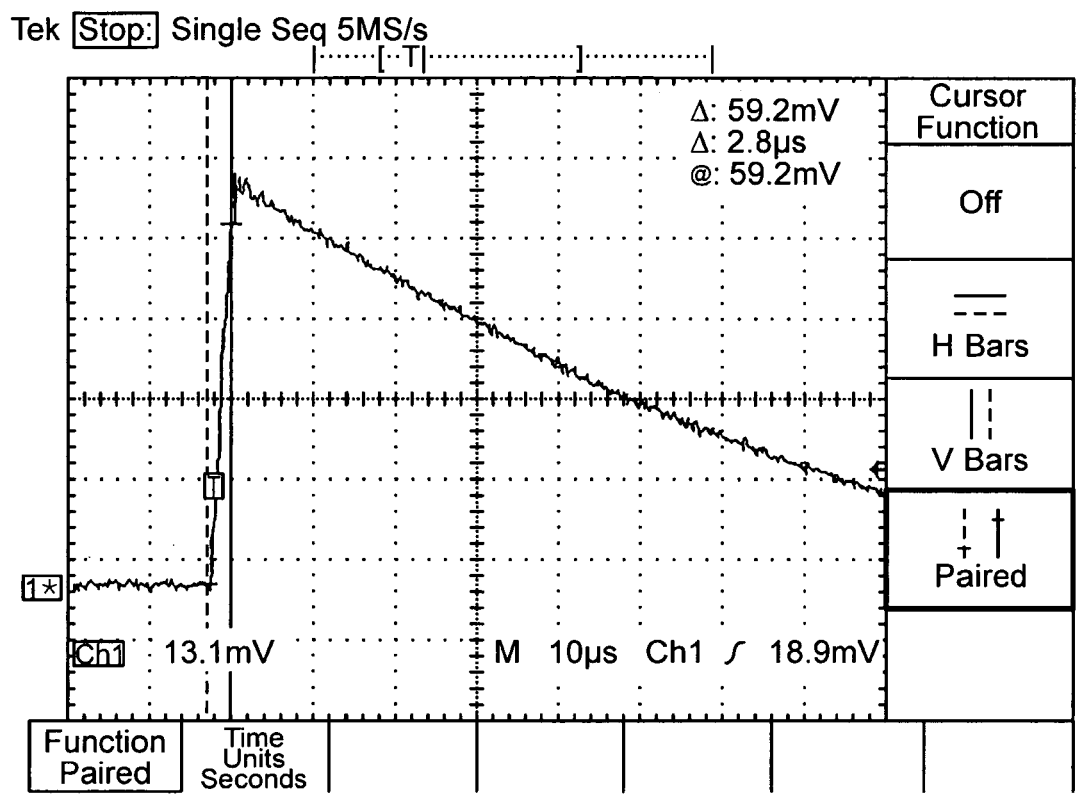
Figure 41:
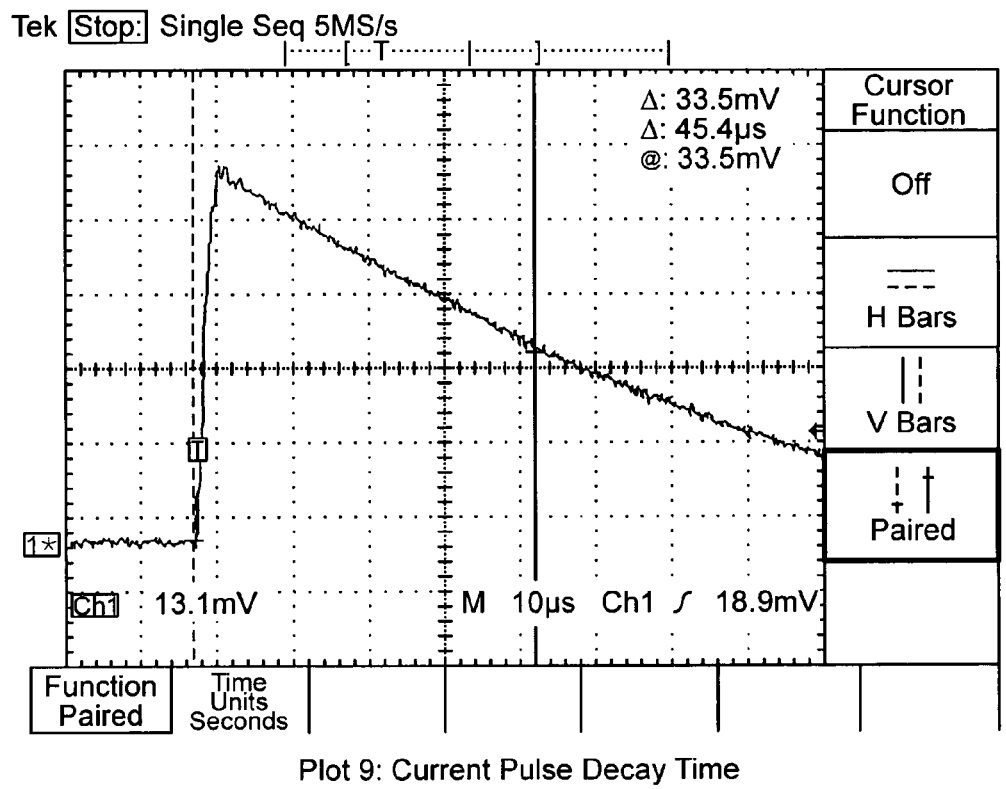

FIGS. 4A-4I are plots of an output signal waveform of an actual circuit manufactured in accordance with the schematic depicted in FIGS. 3A-3B. FIG. 4A shows the amplitude of the output voltage, and indicates a peak measurement of 19.8 kV (a 1000× probe was used during measurement). FIG. 4B shows the frequency of the output voltage; the time between pulses measures 15 ms, which converts to a frequency of 66.7 Hz. FIG. 4C shows a more detailed view of the voltage amplitude by concentrating on a single pulse, again using a 1000× probe. The peak of the pulse measures 19.5 kV and, as in FIG. 4A, the full 50 kV output is not reflected due to the arcing across the output terminals. FIG. 4D shows the width of the voltage pulse, measuring 3.12 µs. FIG. 4E shoes the amplitude of the current. The maximum peak current measured was 6.13 amps. FIG. 4F shows the frequency of the output current. The time between pulses measures 15 ms, which again converts to a frequency of 66.7 Hz. FIG. 4G shows the amplitude of a single current pulse, measuring 6.76 amps. FIG. 4H shows the rise time of the current pulse, measuring 2.8 µs. FIG. 4I shows the decay time of the current pulse measuring 45.4 µs. The waveform is generally square in shape, but other pulsed or repeating waveforms, such as sinusoidal, triangular, and/or sawtooth, are also contemplated.

Testing has demonstrated that the application of waveforms having certain characteristics to live mammals (e.g., mini-pigs) produces muscular contraction and, in some cases, partial or complete tetany without discernible detrimental short- or long-term effects. A number of examples related to these findings follow. Methods of testing the waveforms to achieve the desired muscular response included some or all of the following procedures and protocols.

EXAMPLE 1

Determination of Optimized Frequency to Achieve Tetany in a Mammal

This experiment shows that the optimized frequency of a waveform to produce tetany in a subject mammal is in a range from about 50 Hz to about 70 Hz.

Voltage was maintained while the frequency of the waveform was varied between 1 Hz-1000 Hz, and electromyogram (EMG) data from the mammals was recorded for each stimulus frequency (i.e., 1, 2, 5, 10, 20, 50, 60, 70, 100, 200, 500, 1000 Hz). Stimulating needle electrodes were placed on either side of a femoral nerve of a subject approximately 1 cm apart, while recording electrodes were placed about 8 cm apart, one on a knee and the other in a middle part of the rectus femorus muscle. Recordings were taken from both ipsi- and contralateral sides of the body. The stimulus pulse amplitudes were maintained at 60 V for each frequency tested and duration of the waveform pulse was 0.1 ms in all cases. The waveforms tested comprised a generally square shape pulsed profile. Recorded signals were amplified 2300 X and were bandpass filtered at 10 and 5000 Hz. Data were digitized and stored to a hard disk at 10,000 samples/second for 5 seconds in all cases.

Time and frequency spectra were analyzed to determine the waveform frequency corresponding to maximal muscle contraction. Data means were subtracted from each sample to eliminate the DC component. Time series of each stimulation frequency are plotted and detail of the EMG waveform just following the stimulus pulse is presented in FIGS. 5A-5C. Power spectra were calculated using the discrete Fourier transform in MATLAB.

Application of the stimuli caused various responses in the subjects, from no response to total muscular contraction (i.e., tetany). It was noted that, at low frequencies (less than about 40 Hz), the muscle was able to relax between applications of the stimulus, thus tetany could not be achieved. At higher frequencies (over about 80 Hz), muscles would contract, but were unable to sustain tetany for a prolonged period of time.

The test data was analyzed to determine what waveform characteristics resulted in muscle contraction, and time and frequency spectra were analyzed to determine the frequency corresponding to maximal muscle contraction. Time series of the stimulation frequencies that achieved the greatest degree of muscular contraction are presented in FIGS. 5A-5C.

Figure 5A:
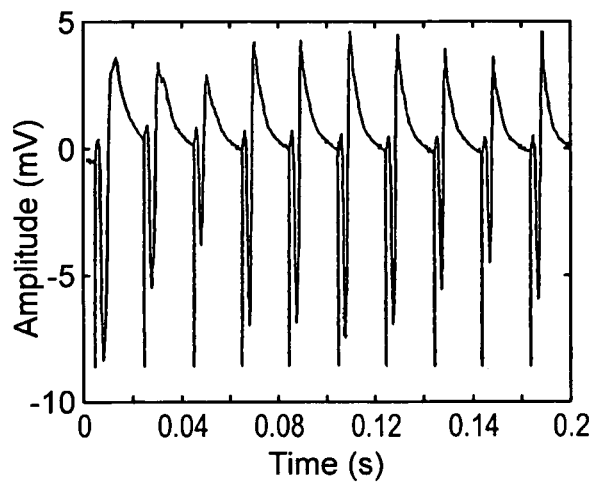
FIGS. 5A-5C are plots of stimulation frequencies for an EMI device manufactured in accordance with one embodiment of the present invention.
Figure 5B:
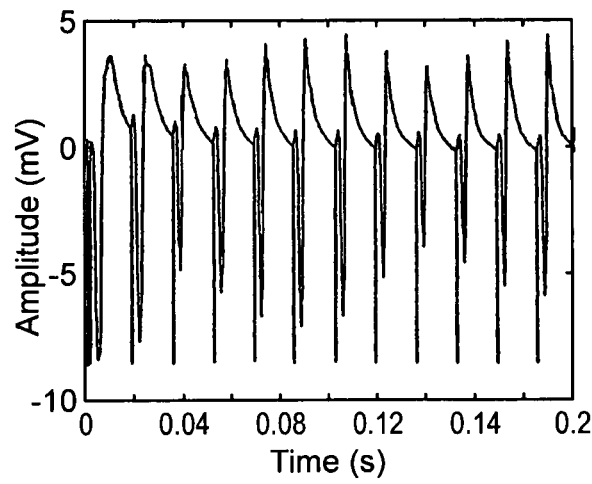
Figure 5C:
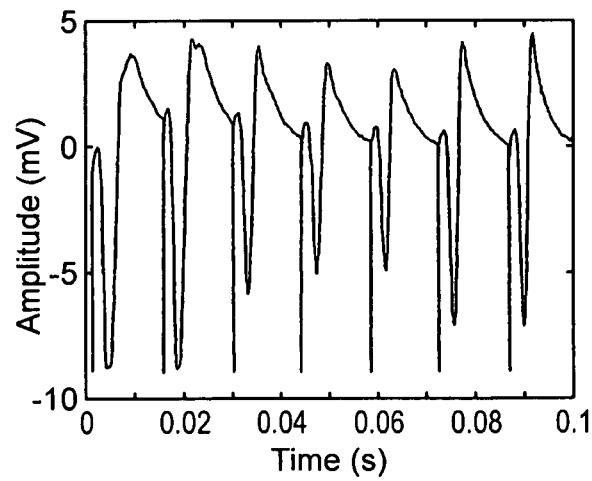

In FIGS. 5A-5C, stimulus frequencies of 50 Hz (FIG. 5A), 60 Hz (FIG. 5B), and 70 Hz (FIG. 5C) are shown. At these frequencies, EMG amplitudes are diminished after the second and subsequent stimuli are applied. Visually, the leg to which the waveform was applied remained tetanic during the entire 5 second signal discharge, indicating maximal incapacitation. The time series was shortened to show detail of the response that lasted about 5 seconds. The responses are inverted due to recording electrode polarity. Stimuli are applied at time points corresponding to the stimulus over the time series shown as sharp voltage transients. EMG waveforms arise from the rectus femoris muscle shortly after the stimulus is applied (about 5 ms). The response shows the muscle does not have time to relax before subsequent stimuli are applied and is in complete tetanic contraction for the duration of the waveform application. This is shown by the EMG never settling at baseline before the next stimulus. Also, the amplitude of each response varies over the duration of the stun, but does not fall below 3.5 mV. Any response above 2 mV indicates strong muscle contraction. Thus, the testing procedures confirm that an optimized EMI waveform with a frequency in a range of about 50 Hz to about 70 Hz achieves tetany in mammals.

EXAMPLE 2

EMI Produced by Waveform Generated by the Circuit of FIGS. 3A-3B

This example demonstrates that the waveform generated by the circuit depicted in FIGS. 3A-3B produces EMI in a mammal.

Stimulating electrodes were fabricated out of 3 mm diameter stainless steel. Care was taken in the design and fabrication process to promote uniform charge distribution during stimulation. Two planar and two hemispherical electrodes were fabricated. The hemispherical electrodes were filed while turning in a drill press until a ball shape was achieved. Layers of primer and enamel paint were applied to all surfaces. The paint was allowed to cure at about 40° C. for 1 hour. To create the planar electrodes, paint was removed from one end with 600 grit sandpaper and the surface was polished with 4-0 emery paper until the surface was shiny. Paint was removed and surfaces were polished on the hemispherical electrodes in the same manner. An additional 2 mm of paint was removed from the base of the hemisphere to expose more surface area. The surface area of the planar electrodes was 0.071 $cm^2$ and hemispherical electrode was 0.33 $cm^2$.

Hemispherical electrodes were chosen for the experiment due to their larger surface area and ease with which they could be positioned. The subject mammal was anesthetized and the ulnar nerve was dissected out of the left wrist. Connective tissue surrounding the nerve was removed and electrodes were positioned under the nerve. Electrodes were oriented parallel with the nerve such that the current path runs from one electrode to another through the nerve, assuming charges penetrate the nerve sheath. Tags made out of surgical tape were used to hold the electrodes in place with haemostatic forceps during stimulation. A Weitlaner was used to hold the surrounding tissue open during stimulation. Care was taken so that the electrodes or alligator clips did not touch the surgical instruments.

The subject was grounded with five salt-bridge electrodes distributed evenly along between the lower neck and hip along the dorsal surface. The stratum corneum was removed with abrasive pads before electrodes were applied. Leads were stripped, wound together, and connected to earth ground. In this round of testing, conductive electrodes 4 cm long and 0.3 cm in diameter were connected to the electrode terminals of the circuit and placed at various locations on the body of the subject. One electrode was placed subcutaneously in the thorax just left of the midline, and the other subcutaneously in the abdomen, just right of the midline. The distance between the two electrodes was about 15 cm. The waveform was generated and full body EMI was observed.

The frequency of the signal generated by the circuit (about 66.7 Hz) in accordance with that depicted in FIGS. 3A-3B falls within the frequency range of the optimized signal, as noted with regard to FIGS. 4B and 4F. It is noted that this frequency is within the optimized frequency range determined in Example 1 and EMI was achieved, as expected. Example 1, above, also indicates that EMG waveforms arose from the stimulated muscle about 5 ms after the stimulus was applied. Such a time delay may be adjusted in a commercial embodiment of the stun device of the present invention. Depending on the characteristics of the waveform, the time period from application to EMI could be greater than or less than about 5 ms. Variation of the time period above this 5 ms datum should be balanced against the reaction time of a subject. A commercial embodiment of the stun device of the present invention could advantageously produce an EMI in a subject before the subject could withdraw or recoil from the device.

EXAMPLE 3

Acute Study of Effects of a Waveform on Subject

The purpose of the experiment was to characterize the acute effects of damped pulsed DC electric fields as produced by the circuit of FIGS. 3A-3B on living tissue.

Several experiments were performed in vivo on mammals, using the circuit in accordance with that depicted in FIGS. 3A-3B. An EMI test device utilizing the circuit in accordance with that depicted in FIGS. 3A-3B was used to deliver electrical signals to the subjects comprising 0.15 µF capacitance. The device was held in a vertical orientation by clamping a 2" PVC pipe to the stand and was assembled such that the device was sheathed in the pipe to permit a uniform downward force on the device resulting from a total mass of 1.5 kg. A 12.0

VDC, 800 mA power supply was used as the power source. The subjects were anesthetized during all electrical discharges and all subsequent monitoring sessions.

Compound muscle action potential (CMAP) recordings were obtained using EMG using pediatric Ag/AgC1 surface electrodes as sensing and reference electrodes. These electrodes were placed over the middle of the muscle belly (recording electrode) and on the common tendon (reference electrode) at the knee (8 cm distal to the recording electrode). Stimulatory signals were delivered cutaneously over the femoral nerve using gold plated electrodes separated by 1 cm. The amplitude of the CMAP was maximized by adjusting the position of the trigger electrodes and the amperage of the stimulating current. The positions of the trigger electrodes, reference, and sensing electrodes were marked using indelible marker so that electrodes could be placed in the same positions at each subsequent monitoring session. A grounding electrode was placed nearby and the stimulation current used was 20 mA, which exceeded the amperage needed to achieve a maximal CMAP by approximately 50%. Pumice alcohol pads were used to mildly abrade the skin surface to reduce the impedance and electrode gel was placed under each electrode. Four or five sequential stimulations and recordings were performed at each time point and the measured values averaged to yield the values reported in FIGS. 6A-6D, 7A-7D, and 8A-8D. In these figures, the results depicted are averaged values for each timed signal dosage. In addition, positive controls (provided by defibrillator discharges, as noted below) are identified by the designator "Avg Defib." Untreated (unstimulated) controls are identified by the designator "Avg Control."

The electrodes were placed in contact with the subject's skin and the waveform was applied for different durations to confirm that damage to the subject is minimal or non-existent. Only one discharge or set of discharges was administered at each dose. Discharges for the acute study were administered in 5 second increments followed by 5 second rests until the total amount of discharge duration added up to the values shown in the figures (i.e., 5, 10, 20, 40, 80, and 160 sec). During these discharges, the respirator was allowed to continue delivering air to the subject at the same rate as mentioned above. The acute (i.e., within 72 hours after administration) electrophysiological responses and effects on nerve, skeletal muscle, and skin survival and tissue morphology were assessed.

Positive control was provided by defibrillator discharges over the ventral thigh. Each positive control subject was exposed to four separate DC discharges over the ventral thigh from a defibrillator set at 360 Joules. These discharges were delivered with one paddle on the left lower abdomen and the other about 10 cm therefrom on the left thigh just above the knee over the muscle and tendons of the quadratus femoris muscle group. Each of these discharges occurred at approximately 200-1500 VDC, 20-65 Amperes, for 5-7 ms. A 2-inch layer of expanded polystyrene was placed under the subject to isolate it electrically from the underlying stainless steel table. As a result, the only current path present was through the paddles of the defibrillator. Blood chemistry samples were drawn at the times indicated and analyzed. The results of these studies allow assessment of health effects of cutaneously-applied DC current derived from the circuit on physiology at several levels.

Figure 6A:
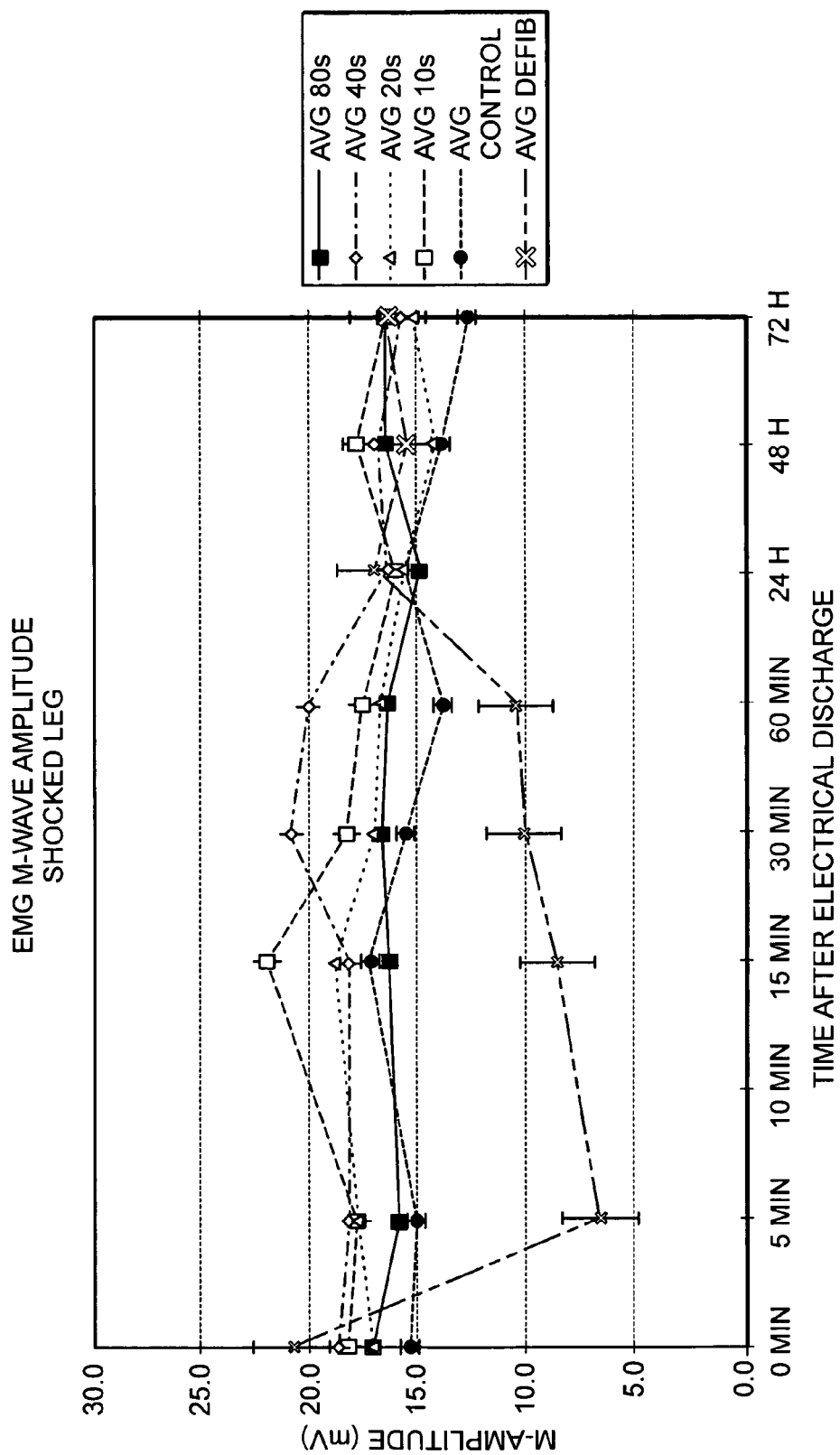
FIGS. 6A-6D are graphs of the acute effects on a stimulated limb of a subject, wherein the subject is stimulated by an electrical waveform generated by the circuit of FIGS. 3A-3B.
Figure 6B:
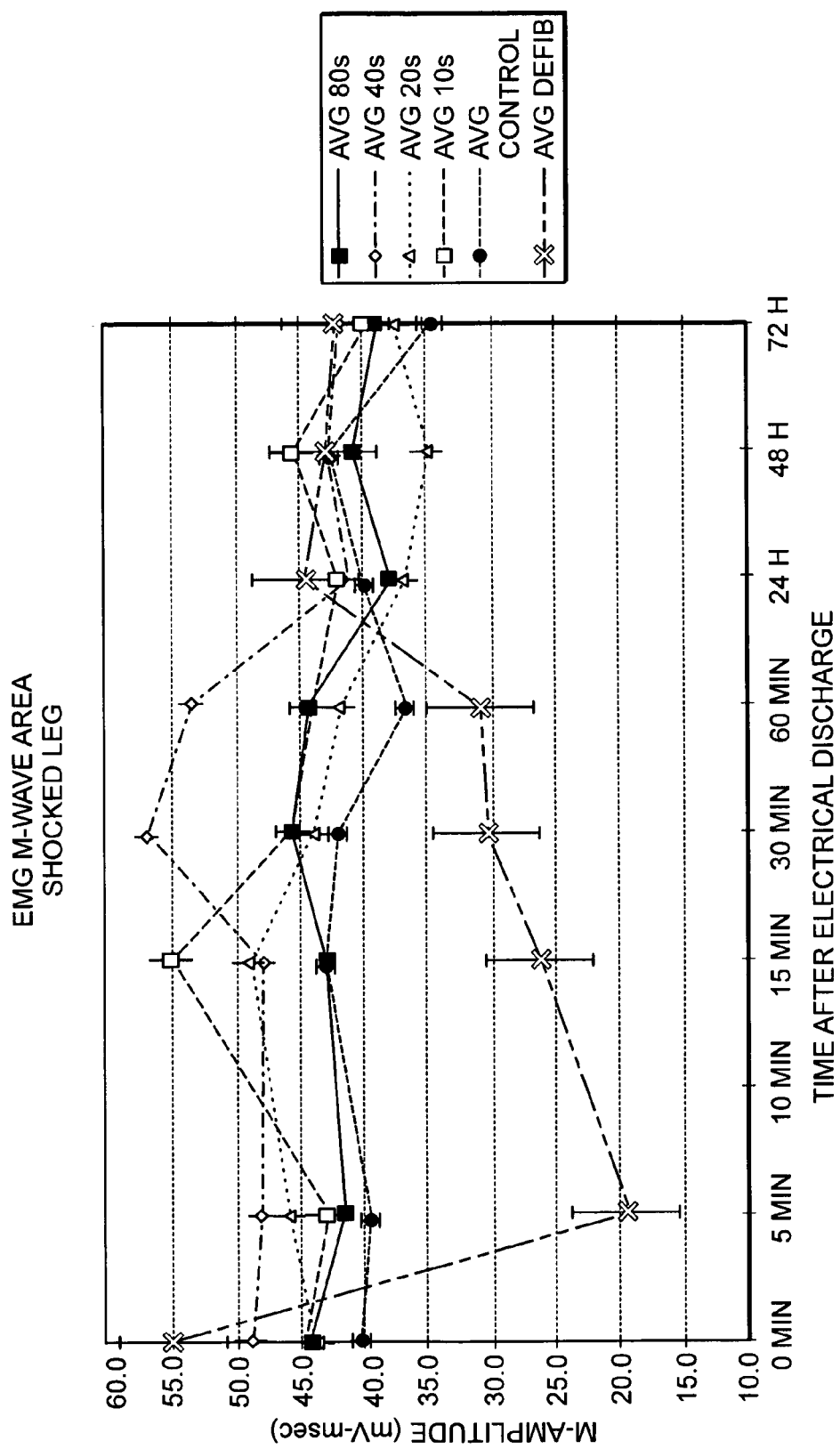
Figure 6C:
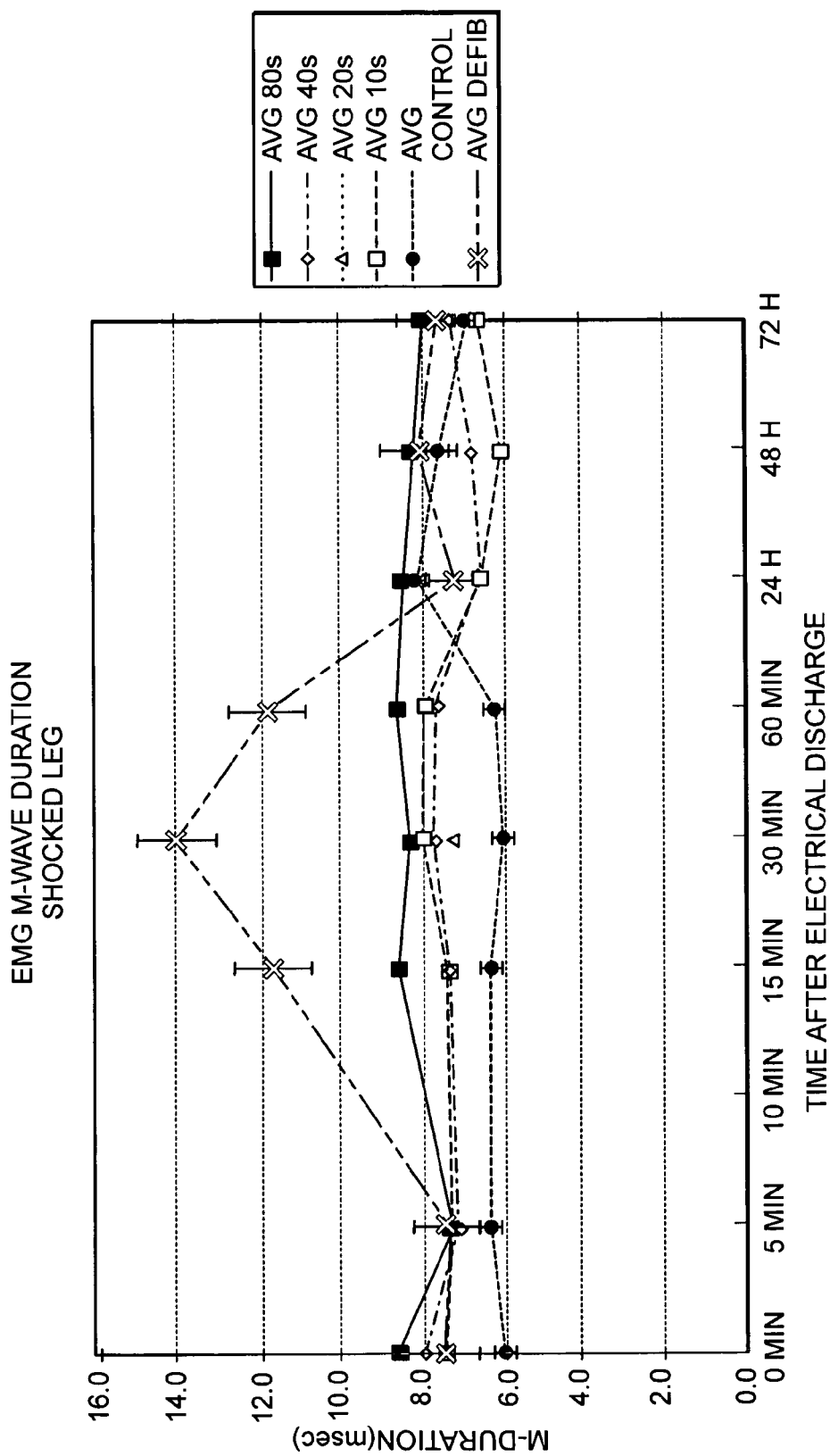
Figure 6D:
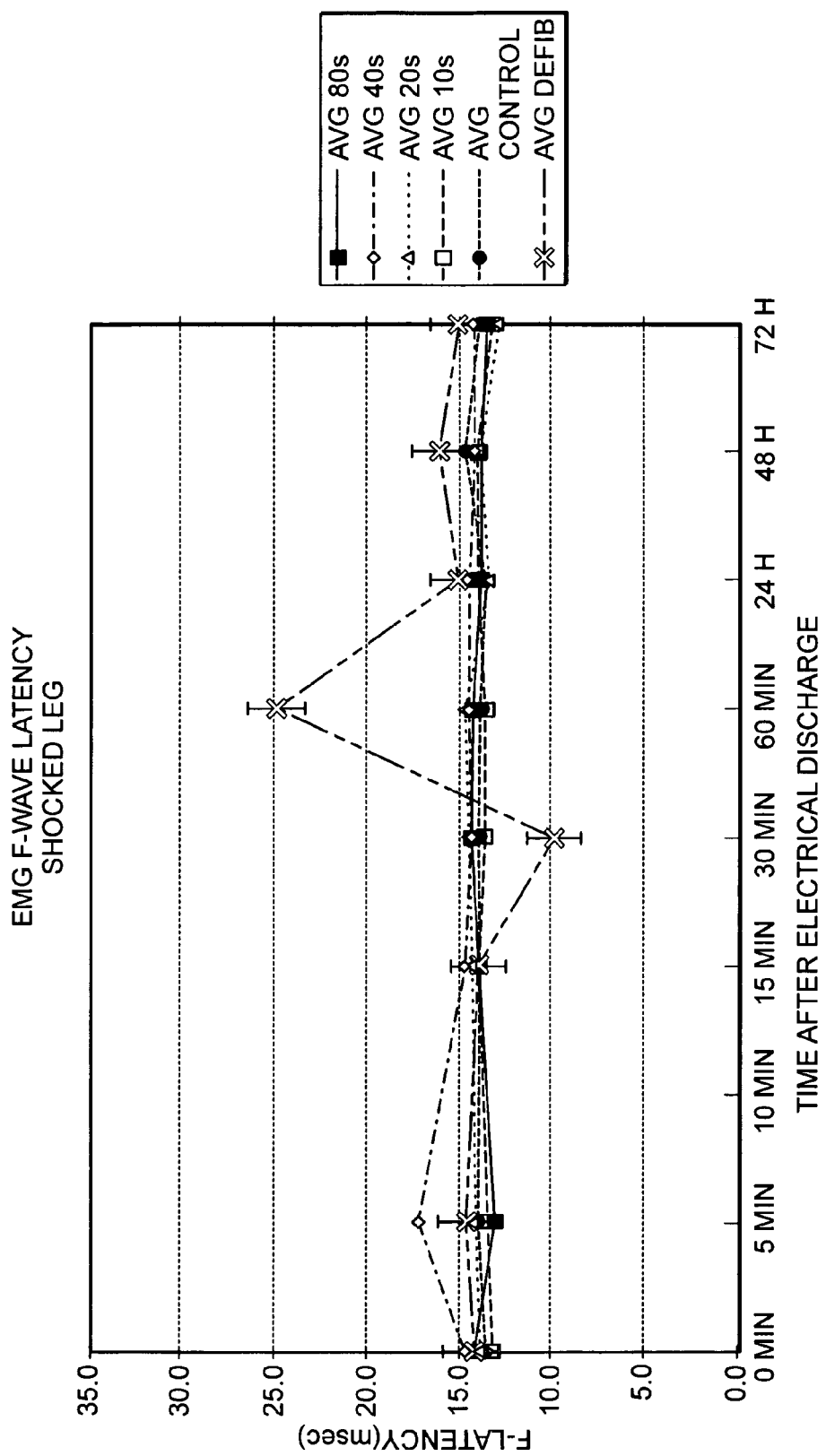
Figure 7A:
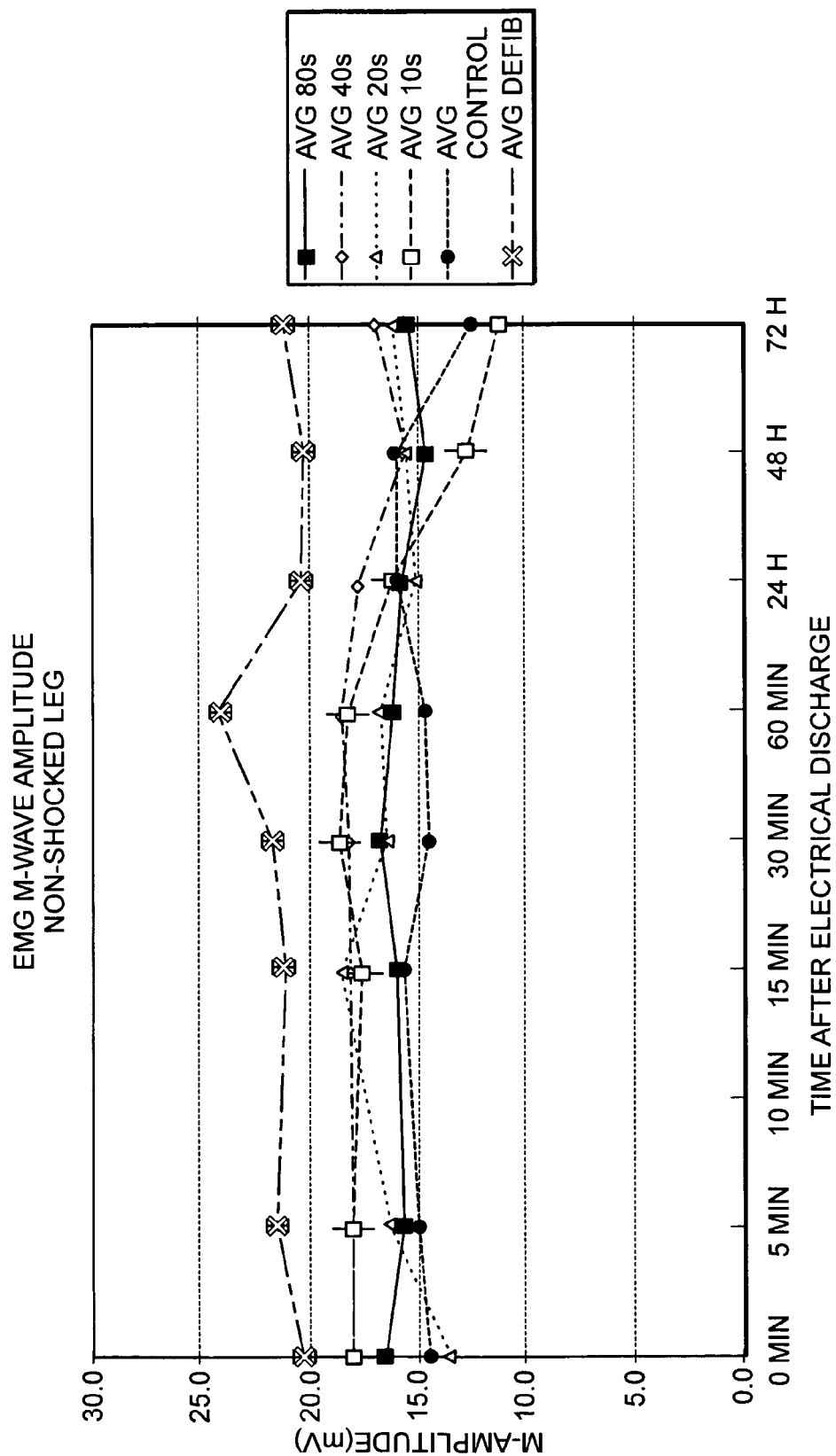
Figure 7B:
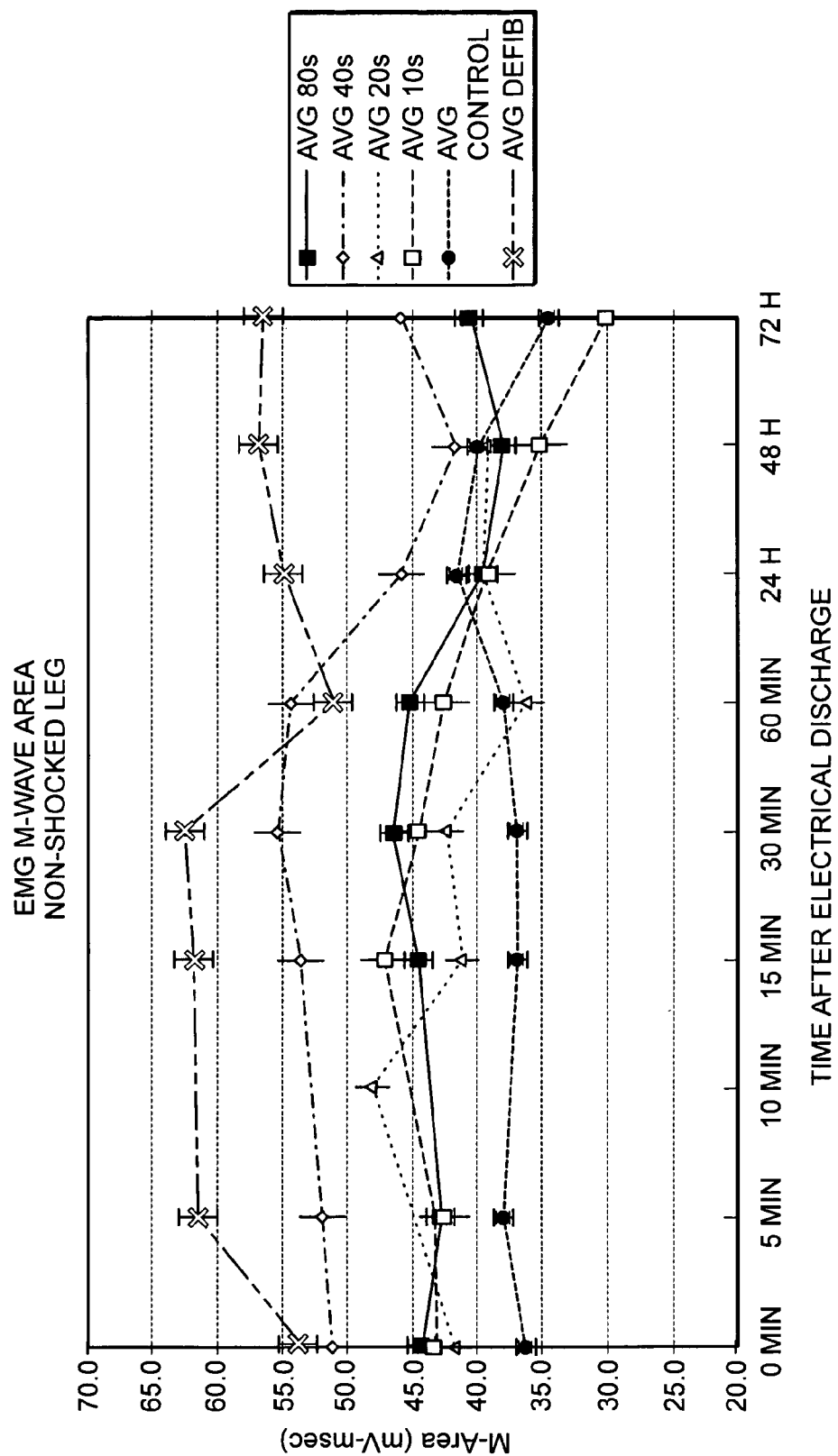
Figure 7D:
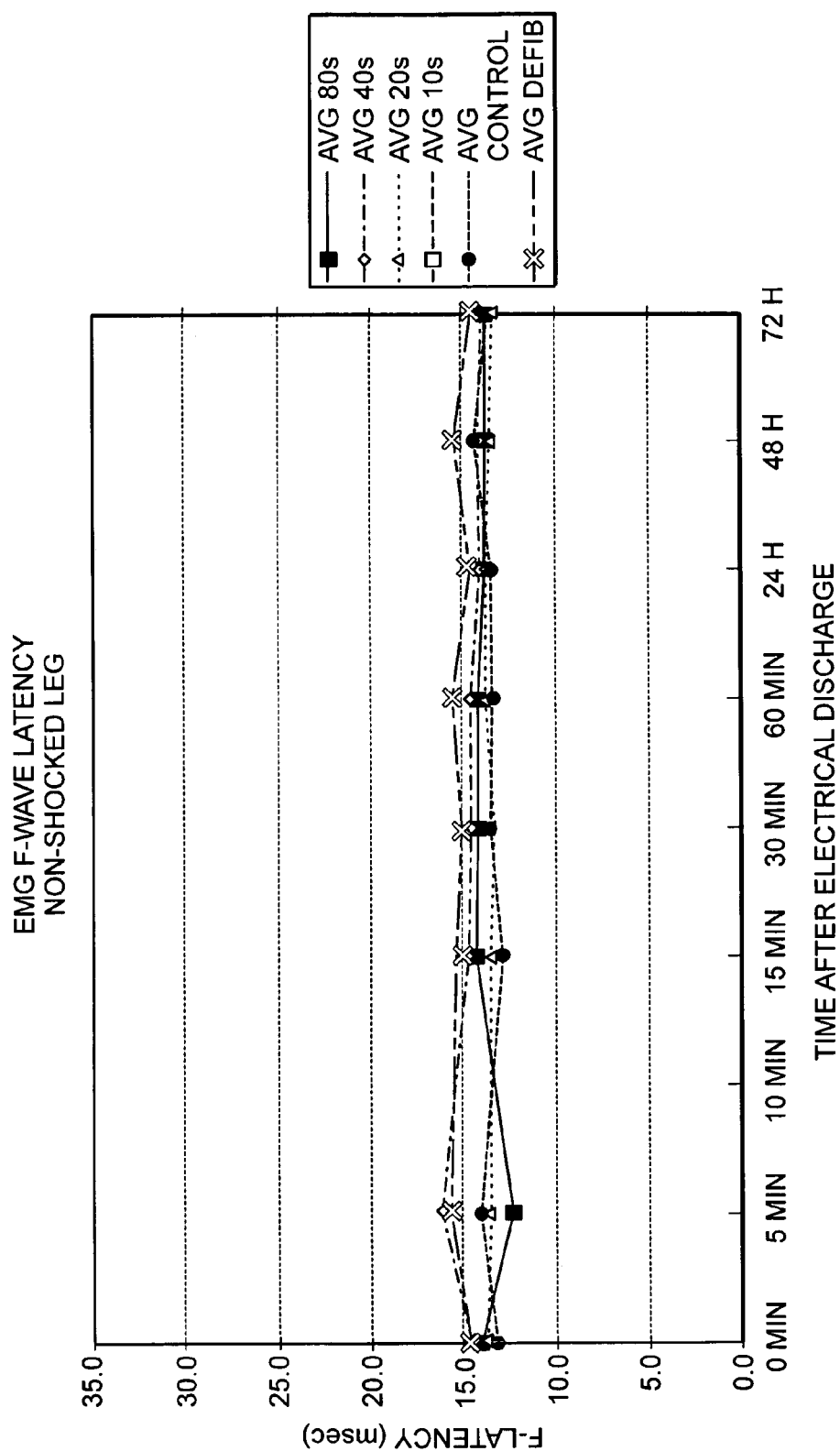

Specifically, FIGS. 6A-6C depict measured parameters of an M-Wave generated by the various dosages of the electrical stimulus generated by the circuit of FIGS. 3A-3B. These measurements were taken in the limb to which the electrical stimulus was applied. The M-wave is indicative of muscular contraction. FIG. 6D depicts the F-Wave latency, again in the limb to which the stimulus is applied. The F-Wave represents the time between the stimulation to the onset of the impulse. FIGS. 7A-7D depict the same parameters as FIGS. 6A-6D, as measured in the non-shocked, contralateral leg.

Figure 8A:
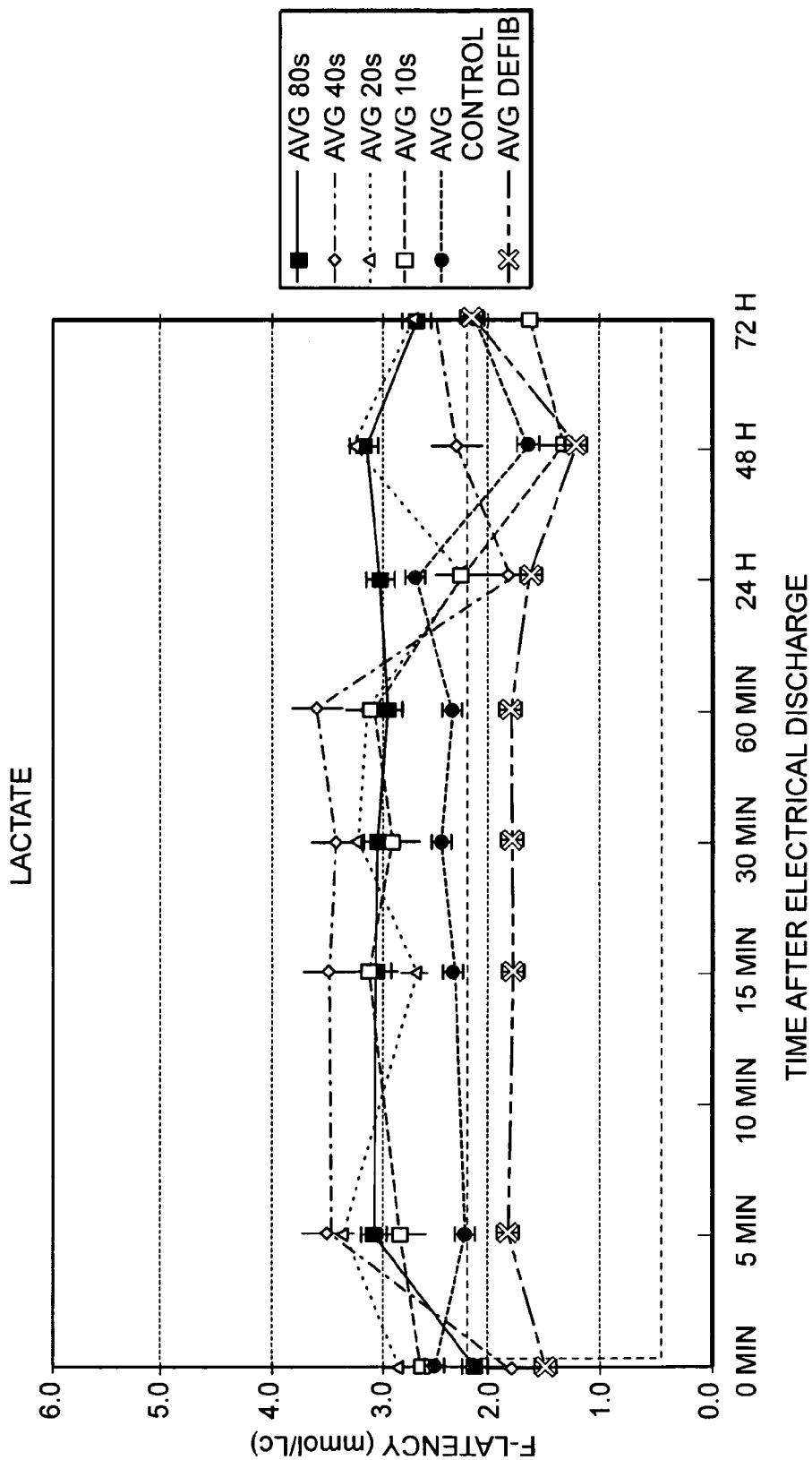
FIGS. 8A-8D are graphs of the acute effects on various blood parameters of a subject stimulated by an electrical waveform generated by the circuit of FIGS. 3A-3B.

FIG. 8A depicts lactic acid concentrations present in the blood as a result of the EMI waveform application. Several indications of a mild but significant respiratory or metabolic acidosis were seen, but these conditions were transient, and indicate that the lactic acid present in the subject remains substantially unchanged, as compared to that parameter measured in the untreated control. Some of these effects can probably be attributed to additional stress associated with multiple, prolonged (e.g., uninterrupted 40 second) discharges without ventilatory support. Related blood analytes reflecting acid-base balance were observed and are within acceptable ranges, including pH and $pCO_2$.

Figure 8B:
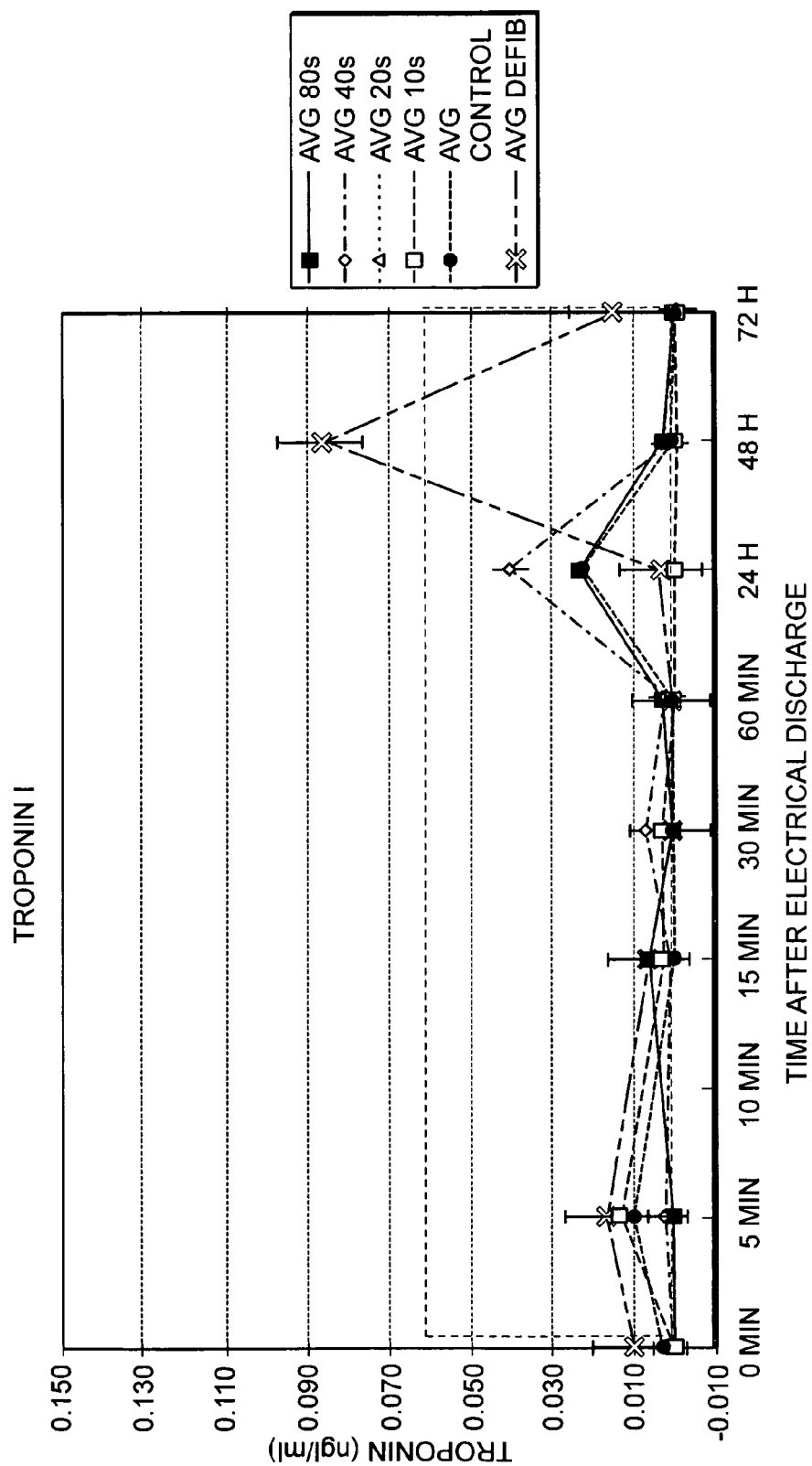
Figure 8C:
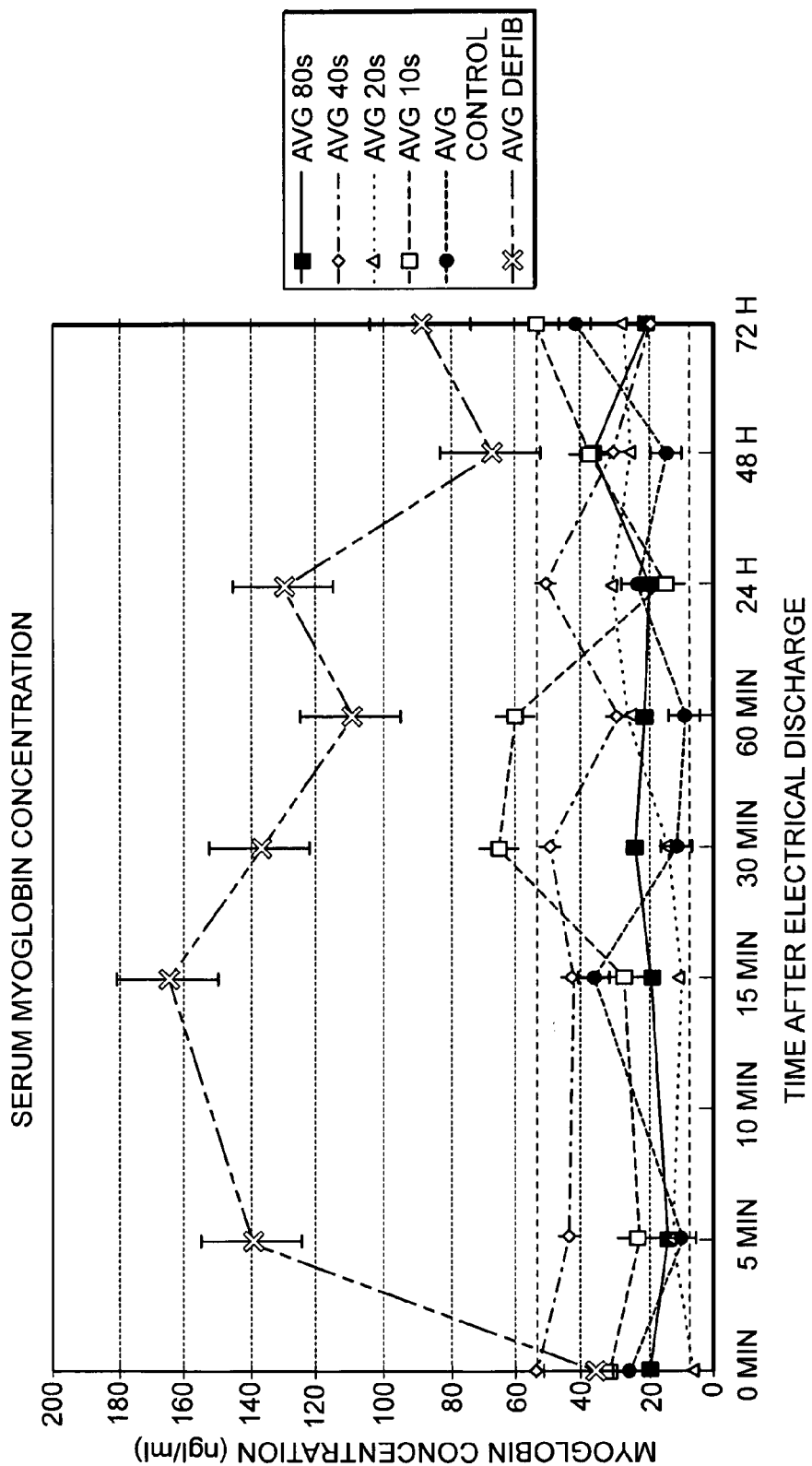
Figure 8D:
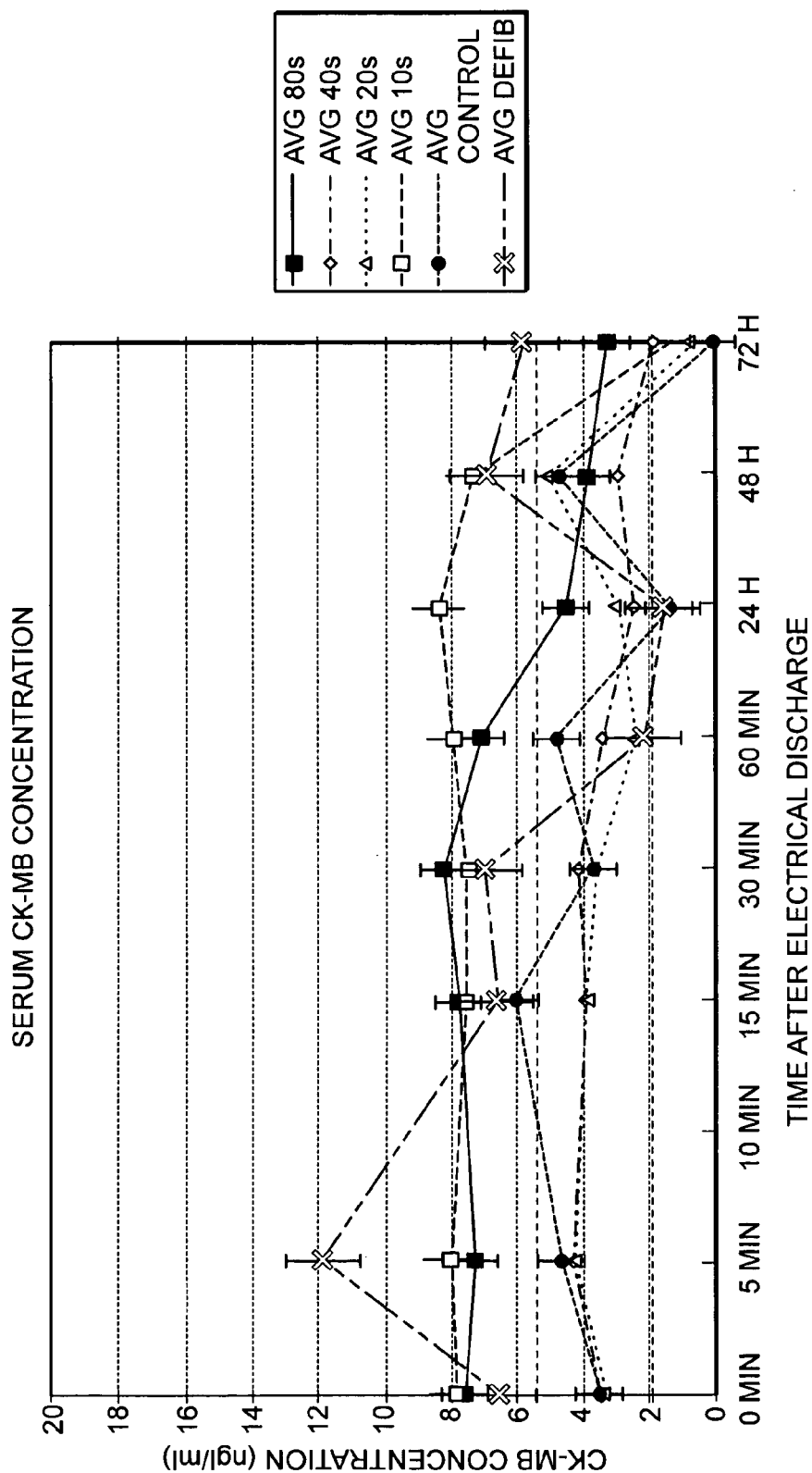

The effects of the discharges on cardiac troponin I concentrations are presented in FIG. 8B. The effects of the discharges on myoglobin concentrations are presented in FIG. 8C. The effects of the discharges on CK-MB concentrations are presented in FIG. 8D. The results indicate that strong muscle responses are possible with minimal damage attendant therewith, as the values of each parameter are substantially unchanged relative to the parameters measured from the control subjects. Discharges from the circuit disclosed in FIGS. 3A-3B caused strong muscle contractions primarily in extensor muscle groups. During the discharge, this occurred initially near the discharge site and then moved to the contralateral limb followed by the upper trunk and appendages. The device discharges had either no effect or only minor effects on blood chemistry values, tissue structure and viability local to the discharge site, skeletal muscle function, and cardiac rhythm during the 72 hour post-discharge time period. Any effects from the EMI discharges seen on the physiological parameters studied were relatively small and transient. This was the case even at high discharge doses, i.e., after 40, 80, or even 160 second discharges into the ventral thigh muscles or directly over the femoral nerve at the inguinal ligament.

In sharp contrast to the effects of the EMI device, defibrillator discharges had marked effects on skeletal muscle function and on numerous blood chemistry values. They also caused clear skeletal muscle and peripheral nerve damage and necrosis and may also have caused some cardiac muscle injury. Myoglobin and CK-MB were unaffected in EMI exposure groups, but strong elevations in myoglobin were observed in the defibrillator group. This is consistent with the severe skeletal muscle damage seen in this group. Notably, no significant increases in troponin I were seen in any of the mammals exposed to EMI discharges from the device described herein. All of the EMG tests showed no significant results, confirming the safety to nerve and muscle tissue. All histological examinations of affected tissues revealed no damage as discerned by histological preparations.

Recurring muscular contraction is accompanied by an increase in lactic acid in the body. If too much lactic acid is generated, and the body is unable to clear the acid, acidosis may occur. The incidence of acidosis increases if a subject is already under exertion or stress due, for example, to exercise, running, fighting, substance ingestion, etc. Accordingly, muscular contraction attendant with limited lactic acid production is desirable in a stun device. Notably, as muscular incapacitation approaches complete tetany, lactic acid production is reduced, making the state of complete tetany substantially safer (from the standpoint of lactic acid production), than incomplete muscle contraction. The low levels of lactate observed were slightly above normal but clearly indicate that lactate levels did not increase as a function of EMI duration. This result is important, as many circumstances of stun device use potentially involve persons with pre-existing high lactate levels, due to exertion and/or drug consumption and/or restraint due to police action.

A number of blood parameters were evaluated, including plasma or serum myoglobin, troponin I, and CK-MB, all of which have been shown to be useful in evaluating possible cardiac muscle damage, usually due to myocardial infarction. Cardiac troponin I has been shown to be the most specific marker for myocardial damage, as this isoform of troponin is located only in the heart and differs from troponin I found in skeletal muscle. Cardiac troponin I levels in blood are usually almost undetectable, but within 4-6 hours post-myocardial infarction, levels change considerably and peak at 12-24 hours. These levels may remain altered for several days.

Myoglobin and CK-MB concentrations can change from non-cardiac related injuries. Serum myoglobin concentrations change within 2-4 hours of myocardial injury, but this marker will also typically change as a result of skeletal muscle damage. CK-MB is found in cardiac and skeletal muscle but is present in much higher amounts in cardiac muscle. CK-MB levels can change within 3-4 hours of cardiac injury and remain so for 60-70 hours. A disadvantage of using the CK-MB marker is that chronic muscle disease, skeletal muscle trauma, and renal failure may also cause serum concentrations to vary. As a result, it is desirable to evaluate for troponin I, myoglobin, and CK-MB to determine the extent of cardiac and skeletal muscle injury.

EXAMPLE 4

Long-Term Study of Effects of Waveform on Subject

The purpose of the experiment was to characterize the long-term effects of pulsed DC electric fields as produced by the circuit of FIGS. 3A-3B on living tissue.

The protocols utilized for Example 4 were essentially the same as those utilized in Example 3, with the following exceptions. A total of 21 subjects were stimulated for 40 second continuous increments with the respirator turned off. At the end of each 40 second discharge, the respirator was turned on to allow 2 breaths and then shut off again. This sequence was repeated twice for an 80 second discharge and 4 times for the 160 second discharge, after the final discharge the respirator was restarted at the previous rate. Since some effects of electrical discharge are delayed for days or weeks after the initial exposure, the long-term (i.e., up to 30 days after administration) effects on these parameters were assessed.

Figure 9A:
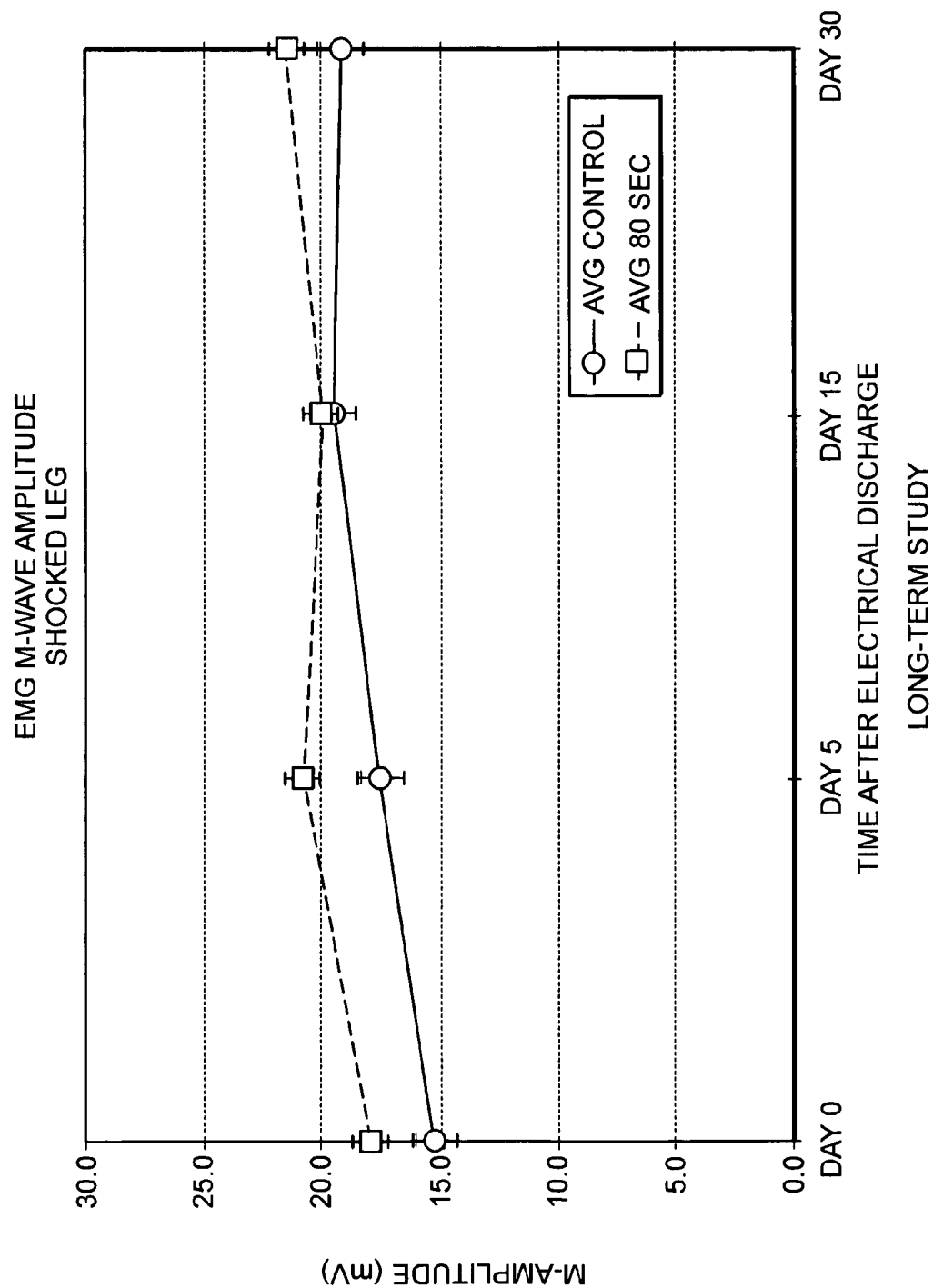
FIGS. 9A-9D are graphs of the long-term effects on a stimulated limb of a subject wherein the subject is stimulated by an electrical waveform generated by the circuit of FIGS. 3A-3B.
Figure 9B:
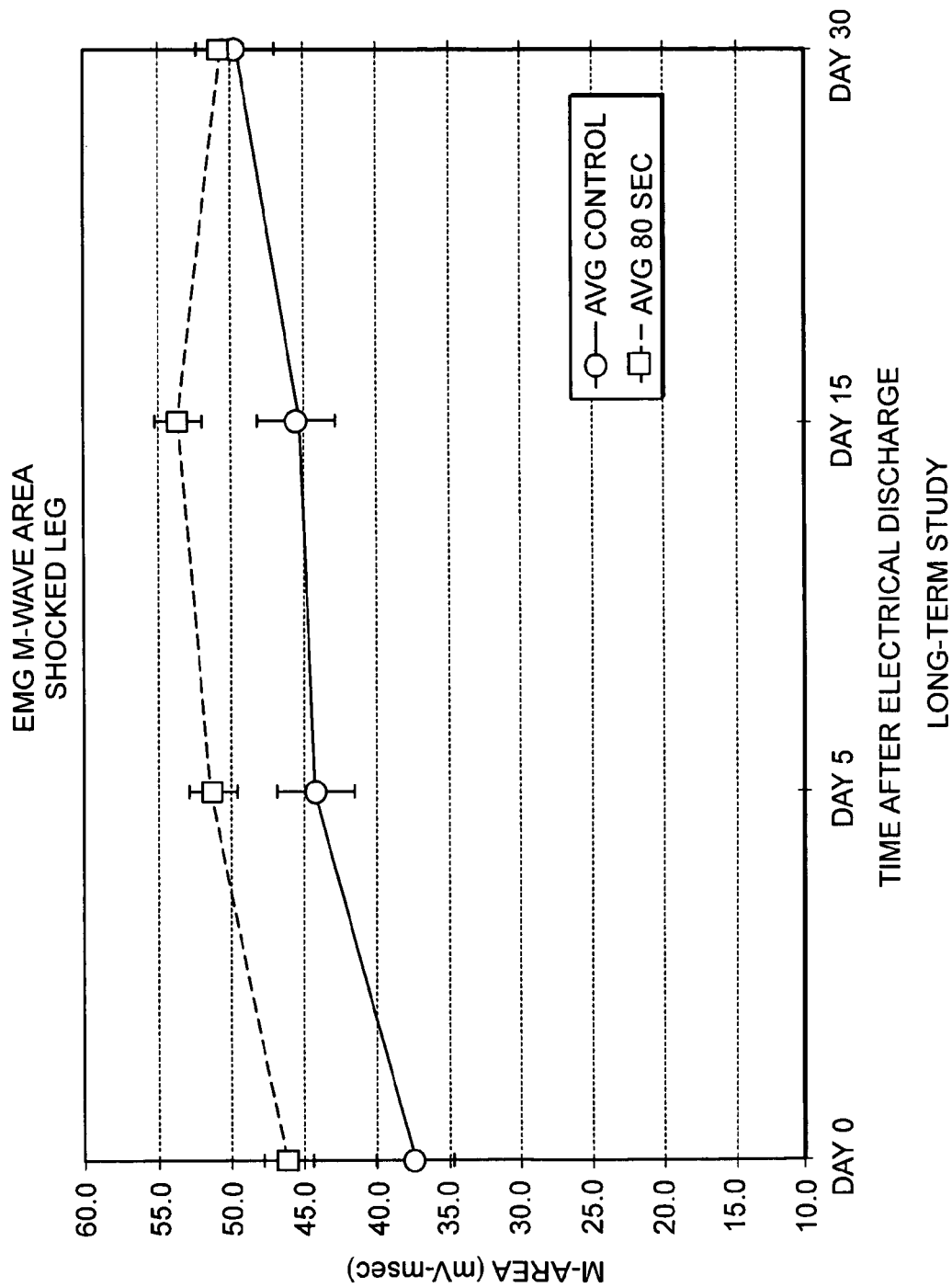
Figure 9C:
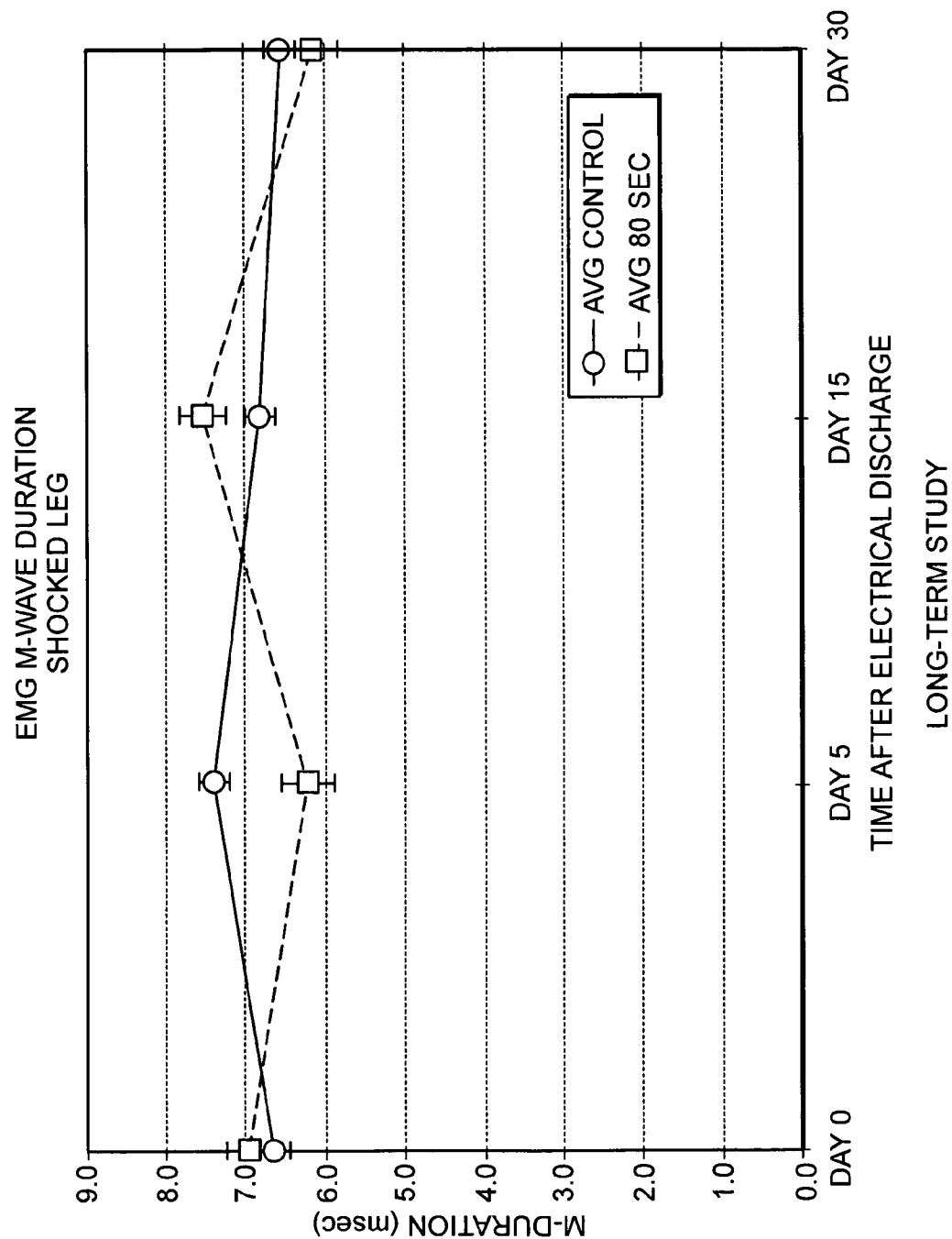
Figure 9D:
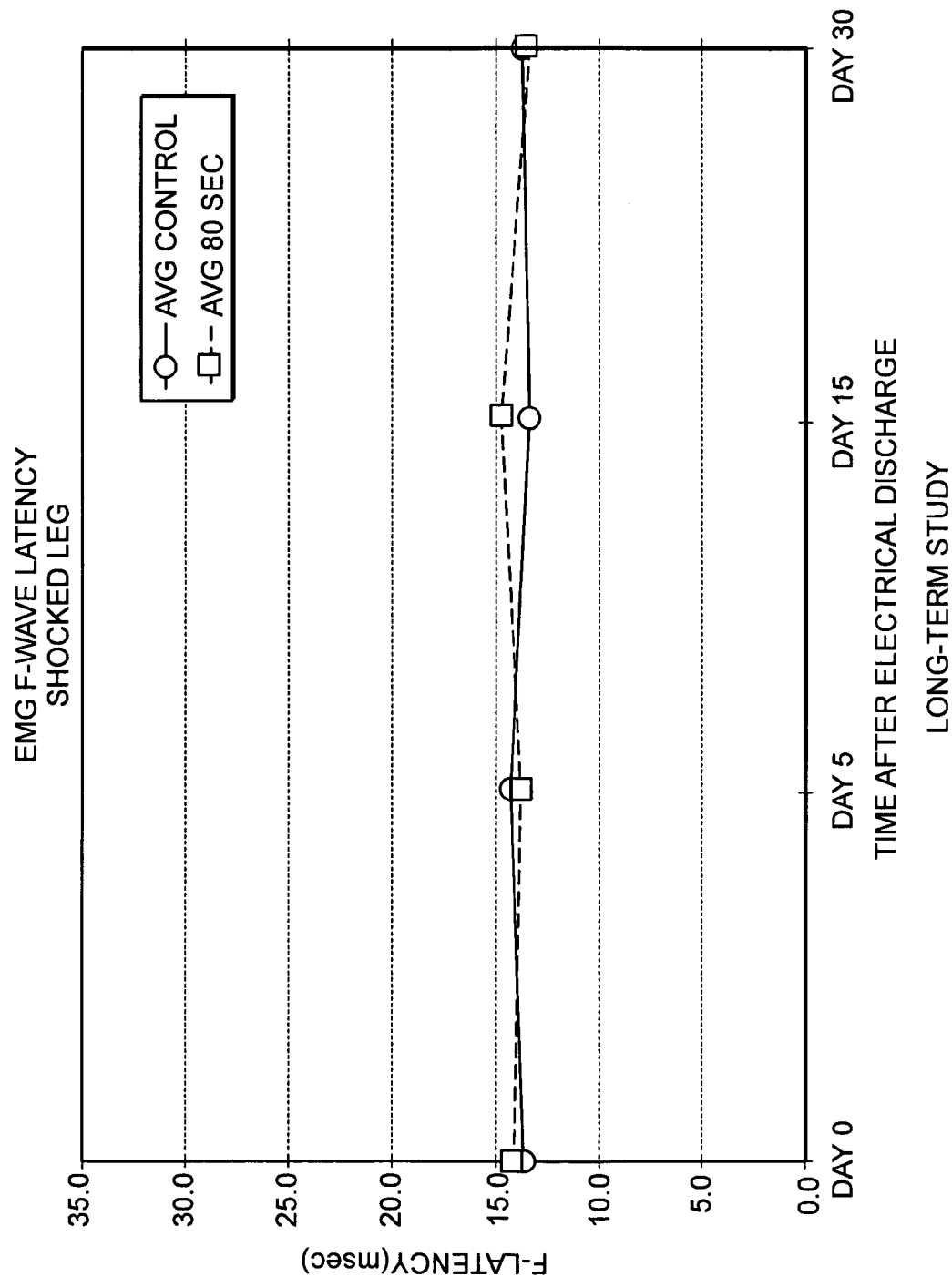
Figure 10A:
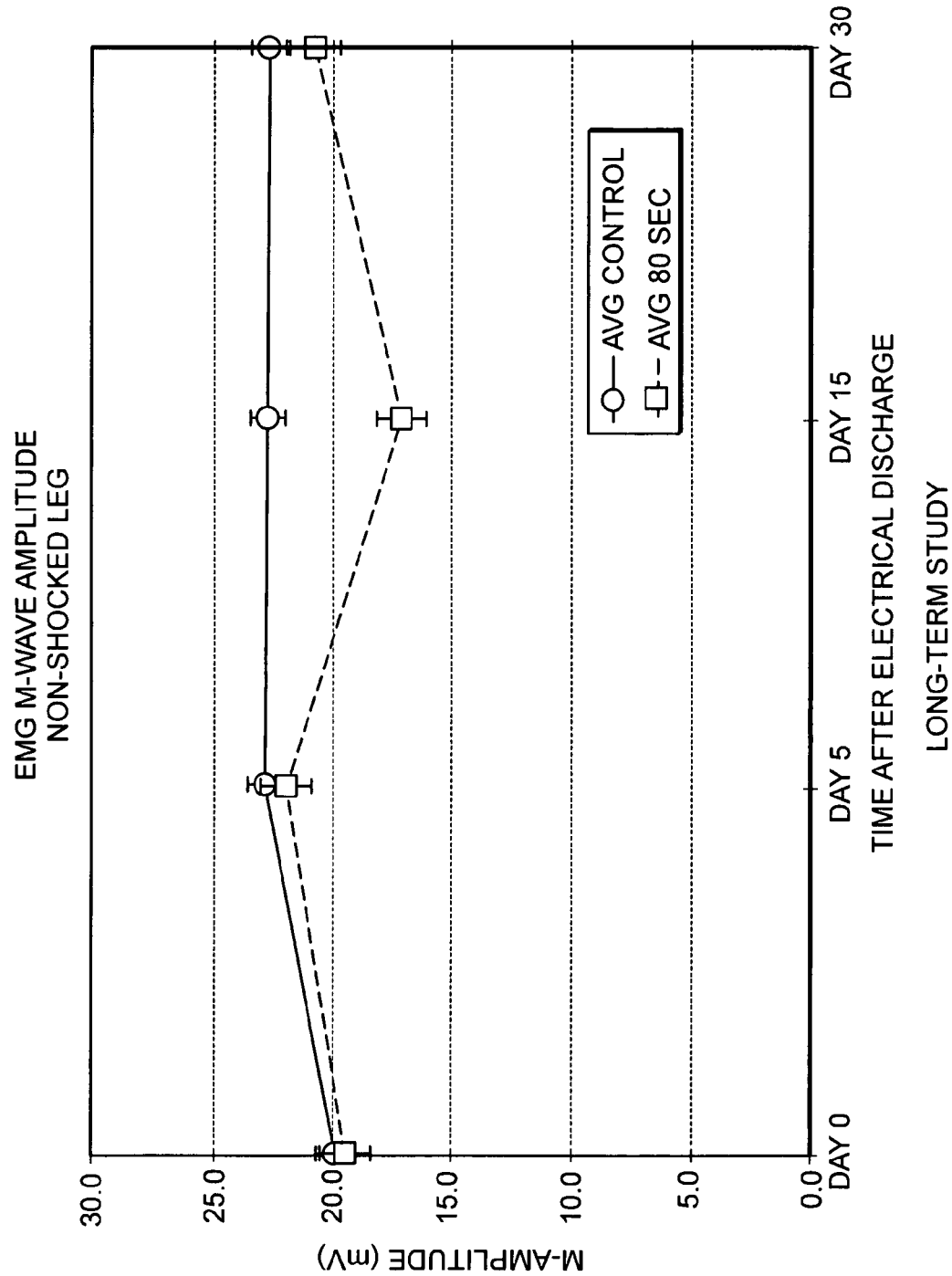
FIGS. 10A-10D are graphs of the long-term effects on a non-stimulated limb of a subject, wherein the subject is stimulated by an electrical waveform generated by the circuit of FIGS. 3A-3B.
Figure 10B:
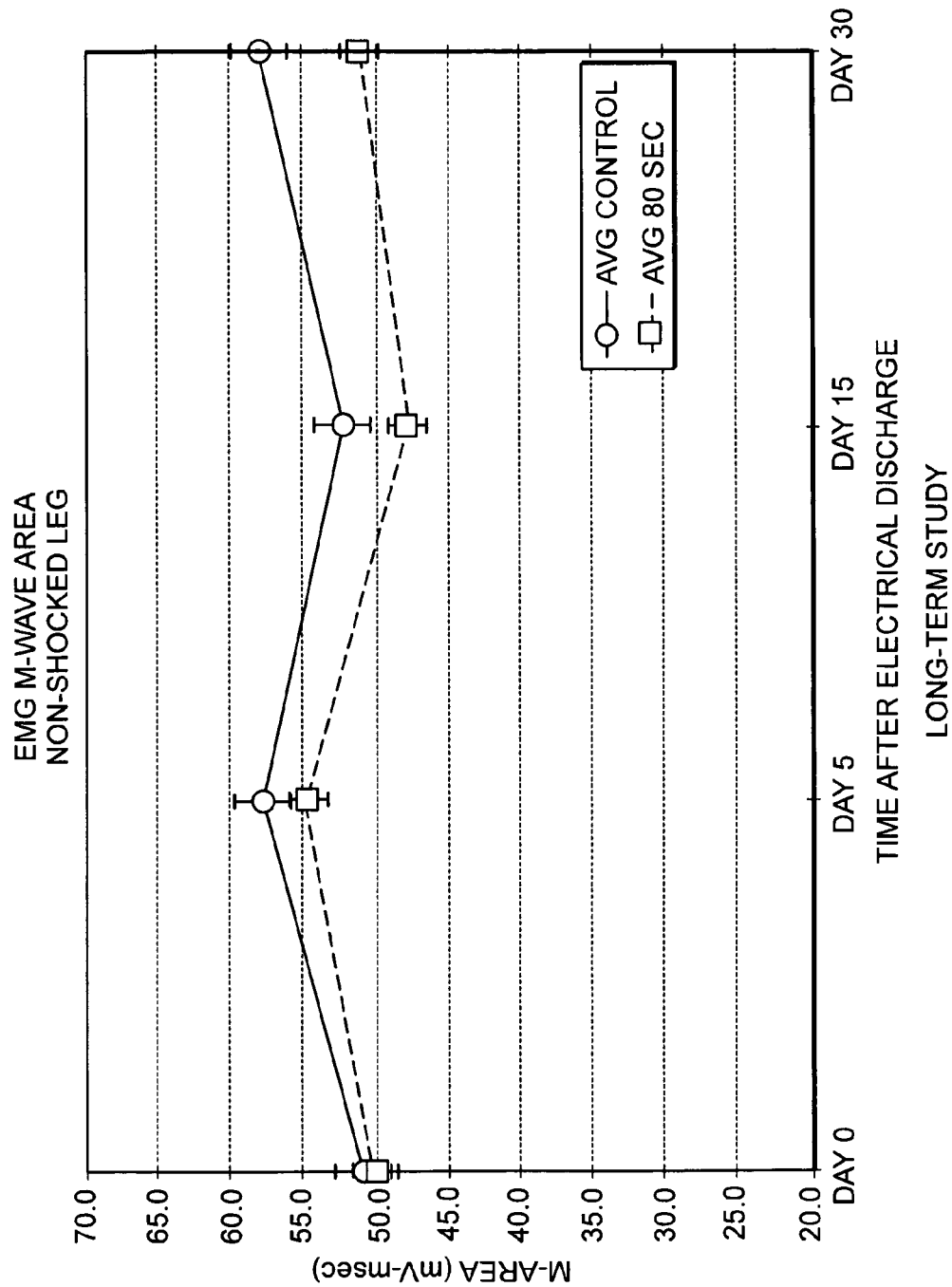
Figure 10C:
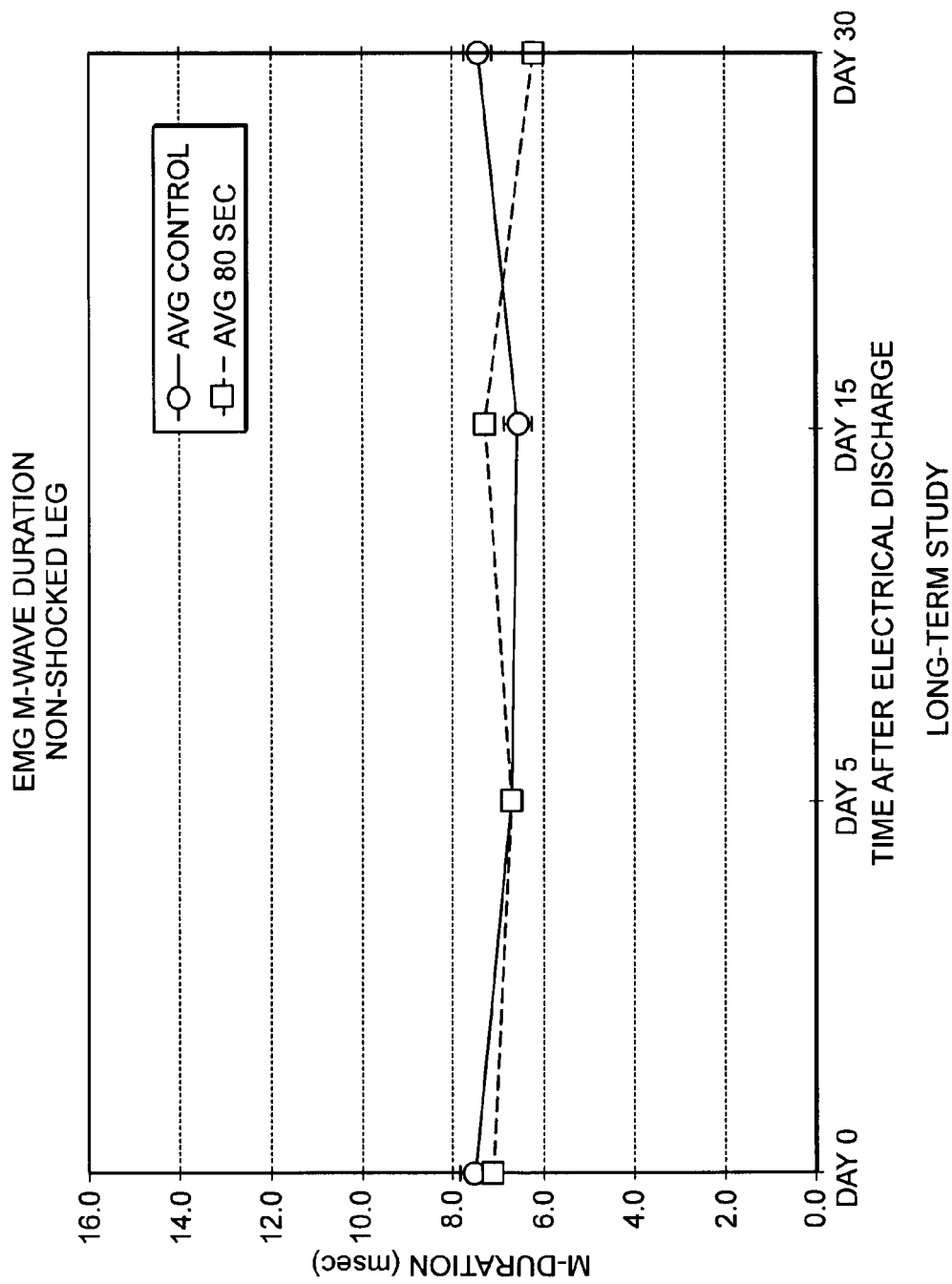
Figure 10D:
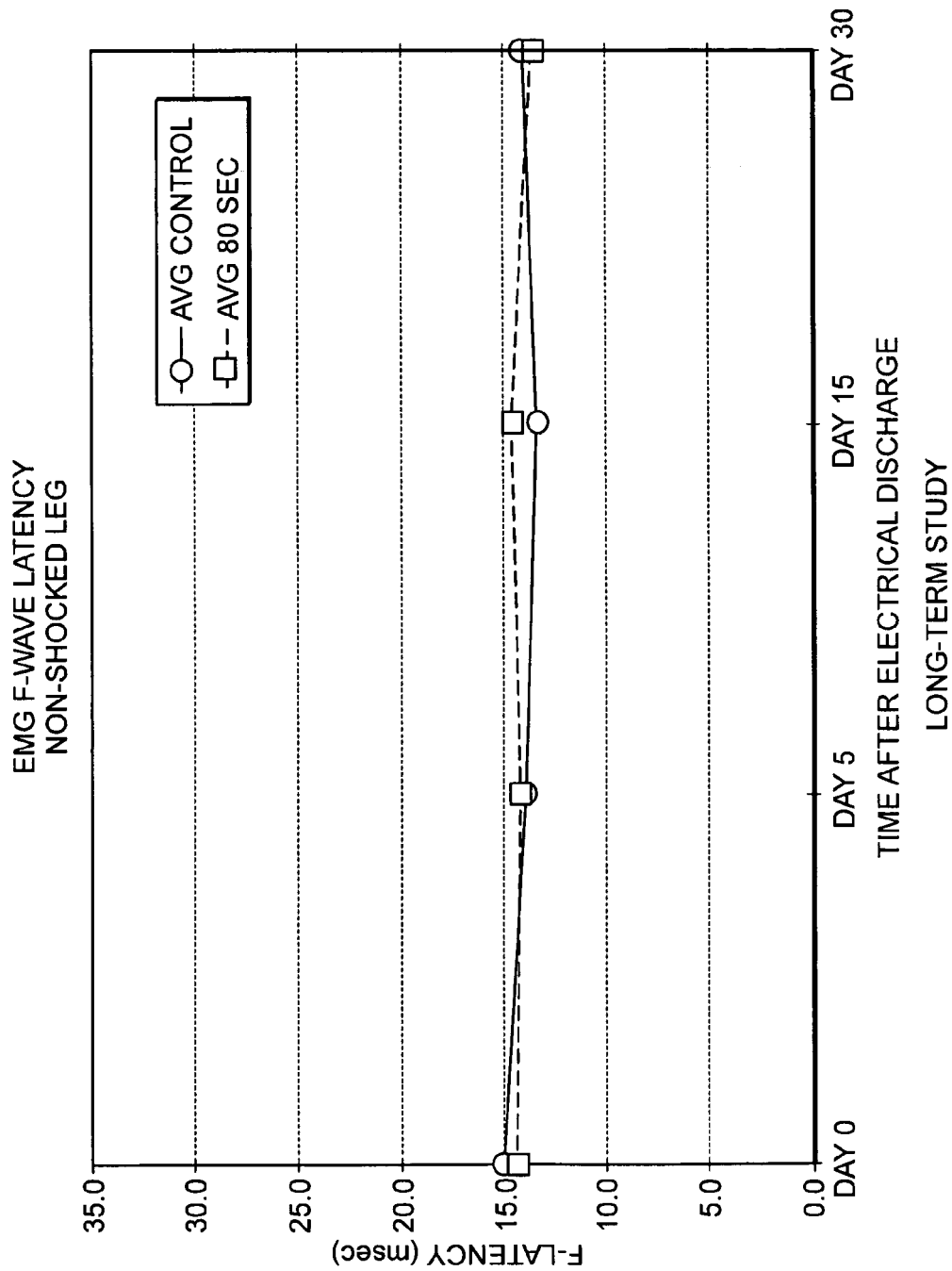

The M-Wave and F-Wave characteristics measured in the acute experiment, above, are depicted in FIGS. 9A-9D (for the shocked leg) and 10A-10D (for the unshocked leg). Specifically, FIGS. 9A-9C depict measured parameters of an M-Wave generated by the average 80 second dosage of the electrical stimulus and the untreated control generated by the circuit of FIGS. 3A-3B. These measurements were taken in the limb to which the electrical stimulus was applied. The M-wave is indicative of muscular contraction. FIG. 9D depicts the F-Wave latency, again in the limb to which the stimulus is applied. The F-Wave represents the time between the stimulation to the onset of the impulse. FIGS. 10A-10D depict the same parameters as FIGS. 9A-9D, as measured in the non-shocked, contralateral leg.

Figure 11A:
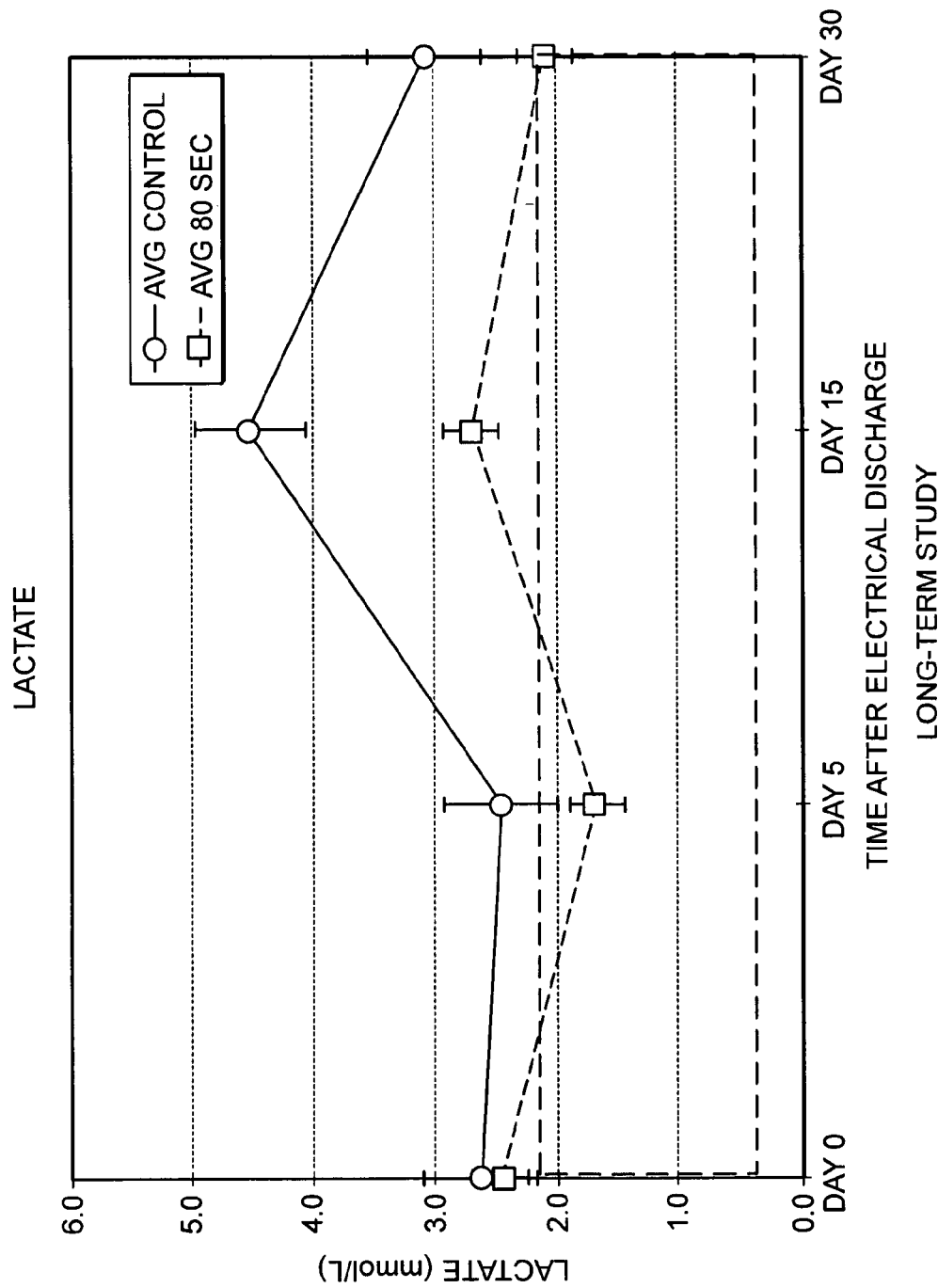
FIGS. 11A-11D are graphs of the long-term effects on various blood parameters of a subject stimulated by an electrical waveform generated by the circuit of FIGS. 3A-3B.
Figure 11B:
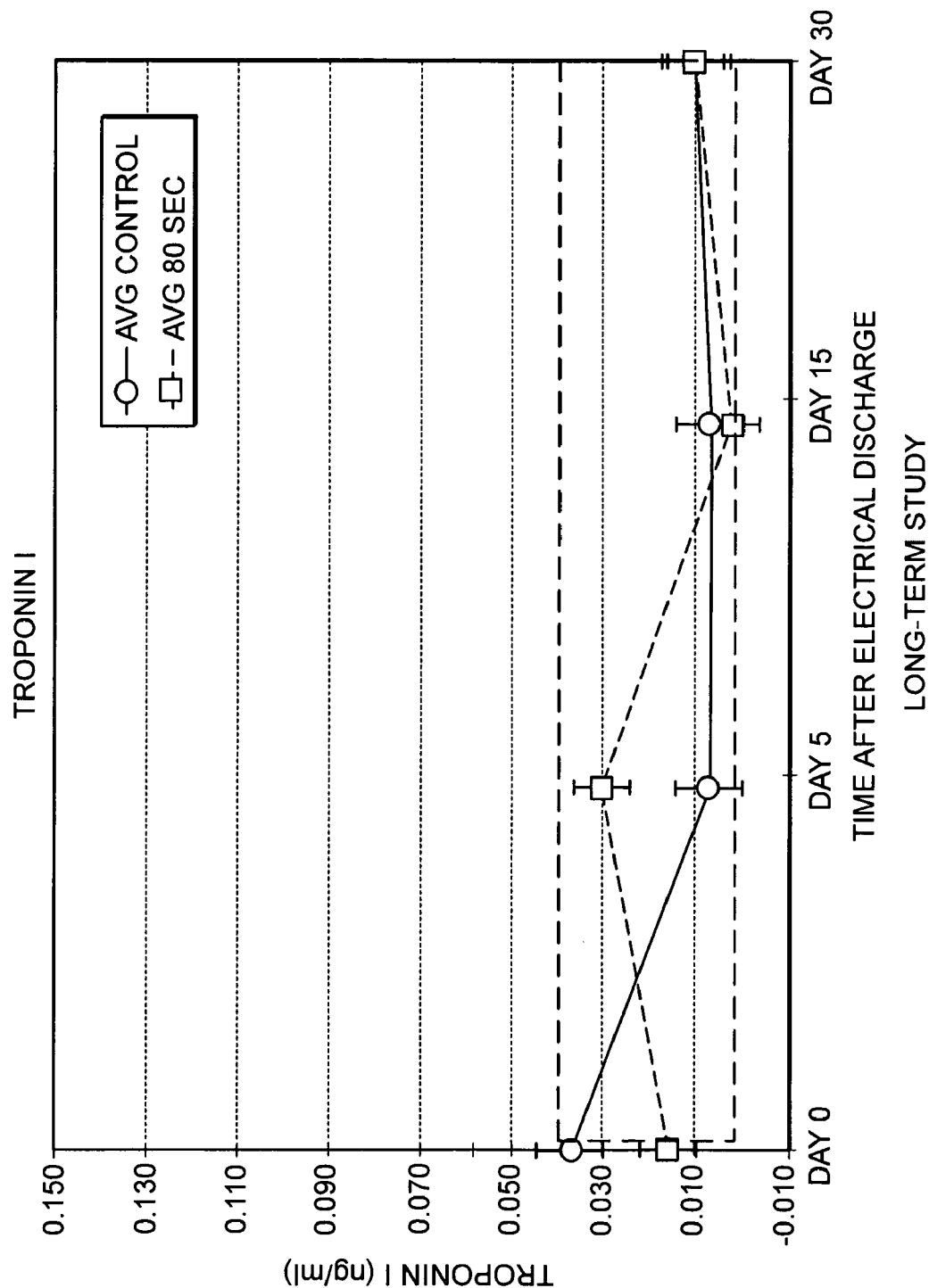
Figure 11C:
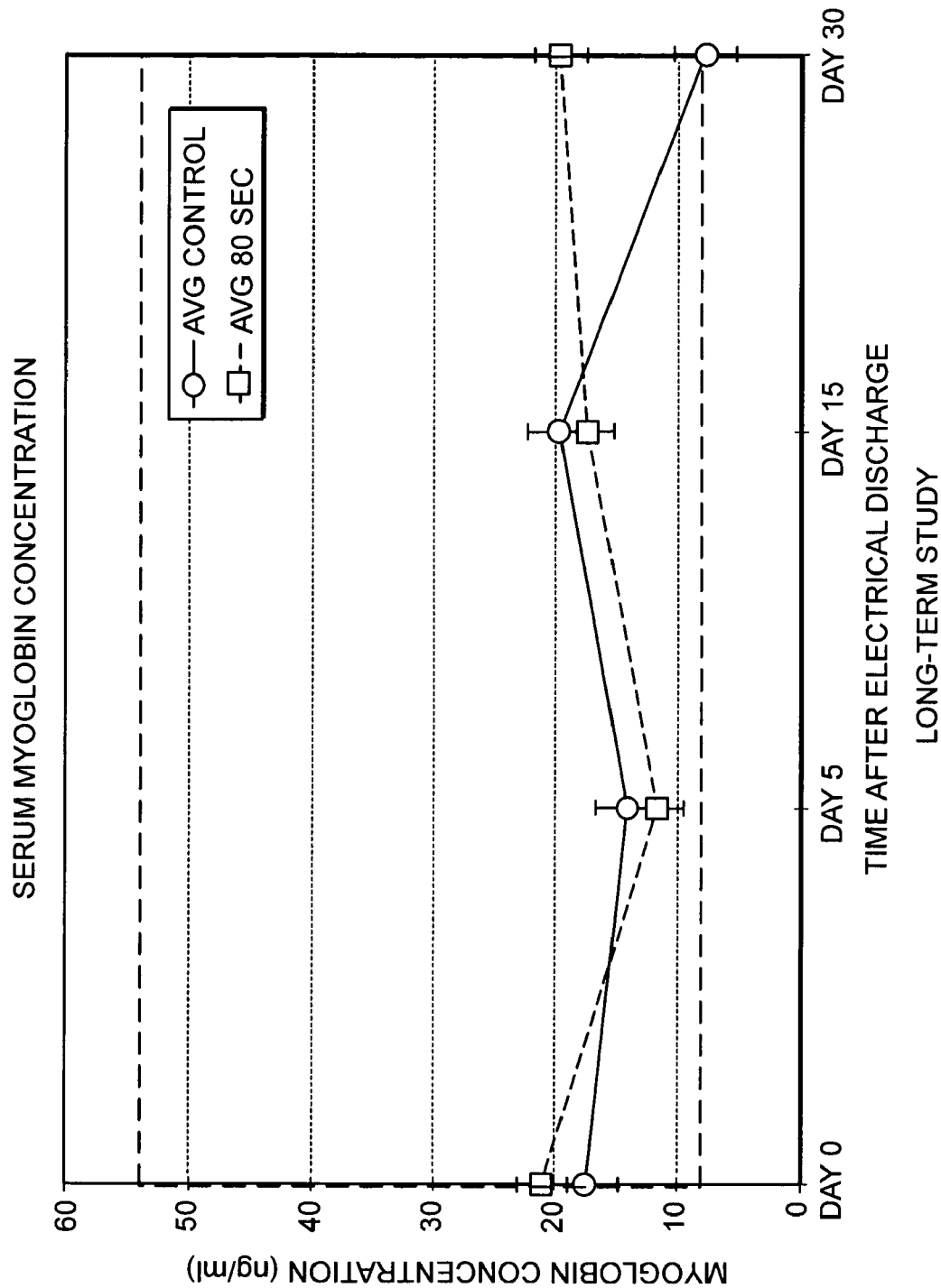
Figure 11D:
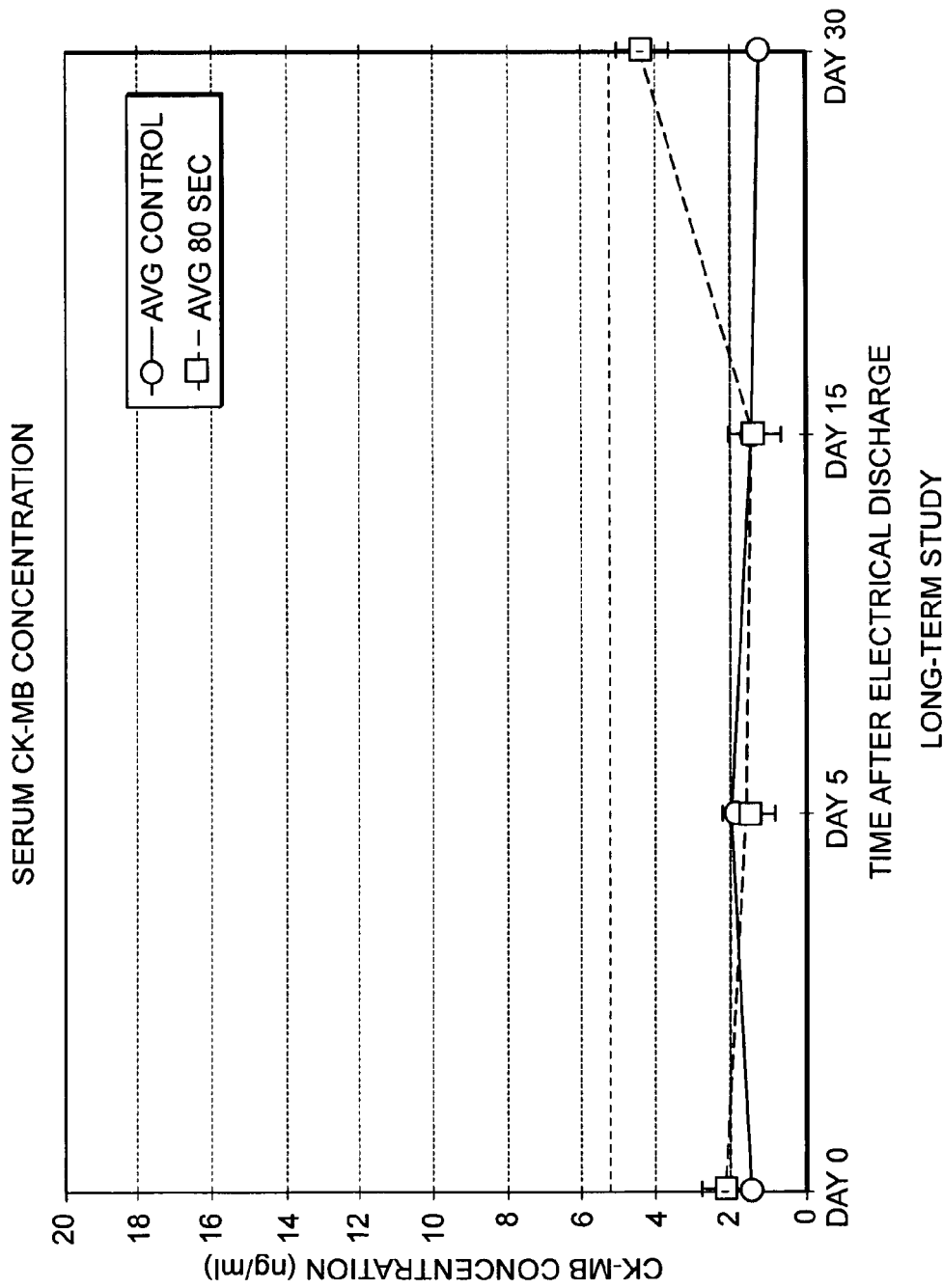

FIG. 11A also indicates that, long after application of the waveform, the lactic acid production in the subject is limited, and remains substantially unchanged relative to the untreated control. As can be seen in FIGS. 11C-11D, the values indicate that no significant changes in serum myoglobin, cardiac troponin I, and serum CK-MB concentrations were present, indicating little or no damage to the subjects observed. All of the parameters studied returned to normal levels during the long-term experiment, or remained unchanged from the parameters measured from the control subjects, offering additional evidence of the safety of the EMI device and waveform described herein. The untreated control is designated in the FIGS. as "Avg Control." These results are similar to those of the acute study, and are indicative of little or no muscular damage in the subjects.

The invention has been described in detail in connection with various embodiments. These embodiments, however, are merely for example only and the invention is not limited thereto. It will be appreciated by those skilled in the art that other variations and modifications can be easily made within the scope of the invention as defined by the appended claims.

What is claimed is:

1. An apparatus for temporarily incapacitating a subject, the apparatus comprising:
   a circuit for generating and delivering a pulsed, low-power electric waveform comprising a peak voltage of less than about 1 kV, a peak DC current of less than about 1 A, a pulse duration from about 3 μs to about 1000 μs, and a frequency from about 40 Hz to about 80 Hz, the waveform generated and delivered over a time period sufficient to induce involuntary muscular contraction with non-injurious muscle effects;
   a plurality of electrical contacts for delivering the waveform to a subject; and
   a switch to selectively activate the circuit.

2. The apparatus of claim 1, wherein each contact comprises at least one of a pad, a button, a nub, a prong, a needle, and a hook.

3. The apparatus of claim 2, further comprising a release mechanism for releasing the plurality of contacts from the apparatus.

4. The apparatus of claim 1, wherein the contacts deliver the waveform to a subject subcutaneously.

5. The apparatus of claim 1, wherein the contacts deliver the waveform to an outer surface of a subject.

6. The apparatus of claim 1, further comprising an elongate body having a first end and a second end, wherein the contacts are located proximate the first end and the switch is located proximate the second end.

7. A method of temporarily incapacitating a subject, the method comprising the steps of:
   generating and delivering a pulsed, lower power electric waveform comprising a peak voltage of less than about 1 kV, a peak DC current of less than about 1 A, a pulse duration from about 3 μs to about 1000 μs, and a frequency from about 40 Hz to about 80 Hz; and
   delivering the pulsed, low-power electric waveform to a subject over a time period sufficient to induce involuntary muscular contraction with non-injurious muscle effects.

8. The method of claim 7, wherein due to application of the waveform, the non-injurious muscle effect comprises a myoglobin concentration value substantially unchanged relative to a control, wherein the control is based upon an absence of application of the waveform.

9. The method of claim 7, wherein due to application of the waveform, the non-injurious muscle effect comprises a CK- MB concentration value substantially unchanged relative to a control, wherein the control is based upon an absence of application of the waveform.

10. The method of claim 7, wherein due to application of the waveform, the non-injurious muscle effect comprises a troponin I concentration value substantially unchanged relative to a control, wherein the control is based upon an absence of application of the waveform.

11. The method of claim 7, wherein due to application of the waveform, the involuntary muscular contraction results in limited lactic acid production, wherein lactic acid production due to application of the waveform is substantially unchanged from lactic acid production prior to application of the waveform.

12. The method of claim 11, wherein due to application of the waveform, a lactic acid concentration of a subject is substantially unchanged relative to a control, wherein the control is based upon an absence of application of the waveform.

13. The method of claim 7, wherein the frequency comprises a value in a range of about 50 Hz to about 70 Hz.

14. The method of claim 13, wherein the frequency comprises a value of about 67 Hz.

15. The method of claim 13, wherein the frequency comprises a value of about 60 Hz.

16. The method of claim 7, wherein the involuntary muscular contraction comprises substantially complete tetany.

17. The method of claim 7, wherein the involuntary muscular contraction comprises partial tetany.

18. The method of claim 7, wherein the time period comprises about 5 ms.

19. The method of claim 7, wherein a duty cycle of the waveform comprises about 0.005% to about 5%.

20. The apparatus of claim 1, wherein the voltage comprises a value of about 425 V.

21. The apparatus of claim 1, wherein the peak current comprises a value of about 0.425 A.

* * * * *